(12) United States Patent
Koga

(10) Patent No.: US 12,339,551 B2
(45) Date of Patent: Jun. 24, 2025

(54) ELECTRO-OPTICAL DEVICE AND ELECTRONIC APPARATUS

(71) Applicant: SEIKO EPSON CORPORATION, Tokyo (JP)

(72) Inventor: Yuki Koga, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/473,269

(22) Filed: Sep. 24, 2023

(65) Prior Publication Data

US 2024/0103329 A1    Mar. 28, 2024

(30) Foreign Application Priority Data

Sep. 27, 2022    (JP) ................. 2022-153438

(51) Int. Cl.
*G02F 1/1368* (2006.01)
*G02B 3/00* (2006.01)
*G02F 1/1362* (2006.01)
*G09G 3/36* (2006.01)

(52) U.S. Cl.
CPC ...... *G02F 1/1368* (2013.01); *G02F 1/136213* (2013.01); *G02F 1/136227* (2013.01); *G02B 3/0056* (2013.01); *G09G 3/3648* (2013.01)

(58) Field of Classification Search
CPC ............ G02B 3/0056; G09G 3/3648; G02F 1/136227; G02F 1/136213; G02F 1/1368; G02F 1/133526; G02F 1/13629; G02F 1/133357; G02F 2201/501; G02F 2201/48

USPC ..................................... 345/33, 87
See application file for complete search history.

(56) References Cited

U.S. PATENT DOCUMENTS

| | | | |
|---|---|---|---|
| 9,331,099 B2* | 5/2016 | Nimura | G02F 1/136227 |
| 2011/0013102 A1 | 1/2011 | Miyazaki et al. | |
| 2015/0041833 A1* | 2/2015 | Nimura | H01L 29/78633 |
| | | | 257/88 |
| 2019/0064584 A1 | 2/2019 | Ito | |
| 2020/0133086 A1 | 4/2020 | Ito | |

FOREIGN PATENT DOCUMENTS

| | | |
|---|---|---|
| JP | 2010271687 | 12/2010 |
| JP | 2012247598 | 12/2012 |
| JP | 2019139252 | 8/2019 |
| JP | 2020067608 | 4/2020 |
| JP | 2021167884 | 10/2021 |

* cited by examiner

*Primary Examiner* — Jimmy H Nguyen
(74) *Attorney, Agent, or Firm* — JCIPRNET

(57) ABSTRACT

A liquid crystal device includes a transistor, a pixel electrode provided corresponding to the transistor, a lens layer provided in a layer between the transistor and the pixel electrode, a capacitance electrode provided in a layer between the transistor and the lens layer, and a relay layer provided in a layer between the capacitance electrode and the pixel electrode to be electrically connected to the capacitance electrode via a contact hole and electrically connected to the pixel electrode via a second contact hole, wherein the relay layer is provided in a region overlapping the capacitance electrode in plan view.

14 Claims, 17 Drawing Sheets

ELECTRO-OPTICAL DEVICE AND ELECTRONIC APPARATUS

The present application is based on, and claims priority from JP Application Serial Number 2022-153438, filed Sep. 27, 2022, the disclosure of which is hereby incorporated by reference herein in its entirety.

BACKGROUND

1. Technical Field

The present disclosure relates to an electro-optical device and an electronic apparatus including the electro-optical device.

2. Related Art

JP-A-2019-139252 discloses an electro-optical device including a pixel electrode formed at a substrate body of an element substrate, a switching element formed between the pixel electrode and the substrate, and a lens formed between the pixel electrode and the switching element.

In JP-A-2019-139252, a depth of a contact hole for electrically connecting the pixel electrode and the switching element is smaller than a depth of a concave surface for a lens.

This configuration prevents reliability of the electrical connecting from deteriorating due to an increase in an aspect ratio of the contact hole, and for this reason, a relay electrode that relays the contact hole is provided at a position shallower than the bottom of the concave surface for a lens between adjacent lenses.

With miniaturization, it is necessary to provide a contact hole having a high aspect ratio in a portion requiring a thickness such as a built-in lens provided between a pixel electrode and a switching element, but it is also necessary to consider a restriction on a layout.

An advantage of some aspects of the disclosure is to provide an electro-optical device that satisfies a restriction on a layout and allows good electrical connecting between a pixel electrode and a switching element.

SUMMARY

An electro-optical device according to an aspect of the present disclosure includes a transistor, a pixel electrode provided corresponding to the transistor, a lens layer provided in a layer between the transistor and the pixel electrode, a first relay layer provided in a layer between the transistor and the lens layer, and a second relay layer provided in a layer between the first relay layer and the pixel electrode to be electrically connected to the first relay layer via a first contact hole and electrically connected to the pixel electrode via a second contact hole, wherein the second relay layer is provided in a region overlapping the first relay layer in plan view.

An electronic apparatus according to an aspect of the present disclosure includes the electro-optical device described above.

DESCRIPTION OF EMBODIMENTS

Embodiments of the present disclosure will be described below with reference to the accompanying drawings.

In the following drawings, the dimensions of some components may be scaled differently for ease of understanding for the components.

Further, hereinafter, for convenience of explanation, the description will be made appropriately using an X-axis, a Y-axis, and a Z-axis orthogonal to each other. Also, one direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction. Further, in the following description, viewing in the Z1 direction or the Z2 direction is referred to as "plan view", and viewing in a direction perpendicular to a cross-section including the Z-axis is referred to as "cross-sectional view".

Further, in the following description, for example, with respect to a substrate, the description "on the substrate" means any of a case in which the element is disposed on the substrate in contact therewith, a case in which the element is disposed on the substrate with another structure interposed therebetween, and a case in which the element is partially disposed on the substrate in contact therewith and partially disposed with another structure interposed therebetween. In addition, the description of an upper surface of a certain configuration indicates a surface of the configuration on the side on the Z1 direction side, for example, an "upper surface of a light transmitting layer" indicates a surface of the light transmitting layer on the side on the Z1 direction side. In addition, the description of a bottom surface of a certain configuration indicates a surface of the configuration on the side in the Z2 direction, for example, a "bottom surface of a contact plug" indicates a surface of the contact plug on the side in the Z2 direction.

1. Embodiment 1

In the embodiment, as an electro-optical device, an active drive liquid crystal device having a thin film transistor (TFT) being a switching element for each of pixels will be described as an example. The liquid crystal device is used, for example, as a light modulation device in a projection type display device as an electronic apparatus which will be described below.

1.1. Outline of Structure of Liquid Crystal Device

Figure 1:
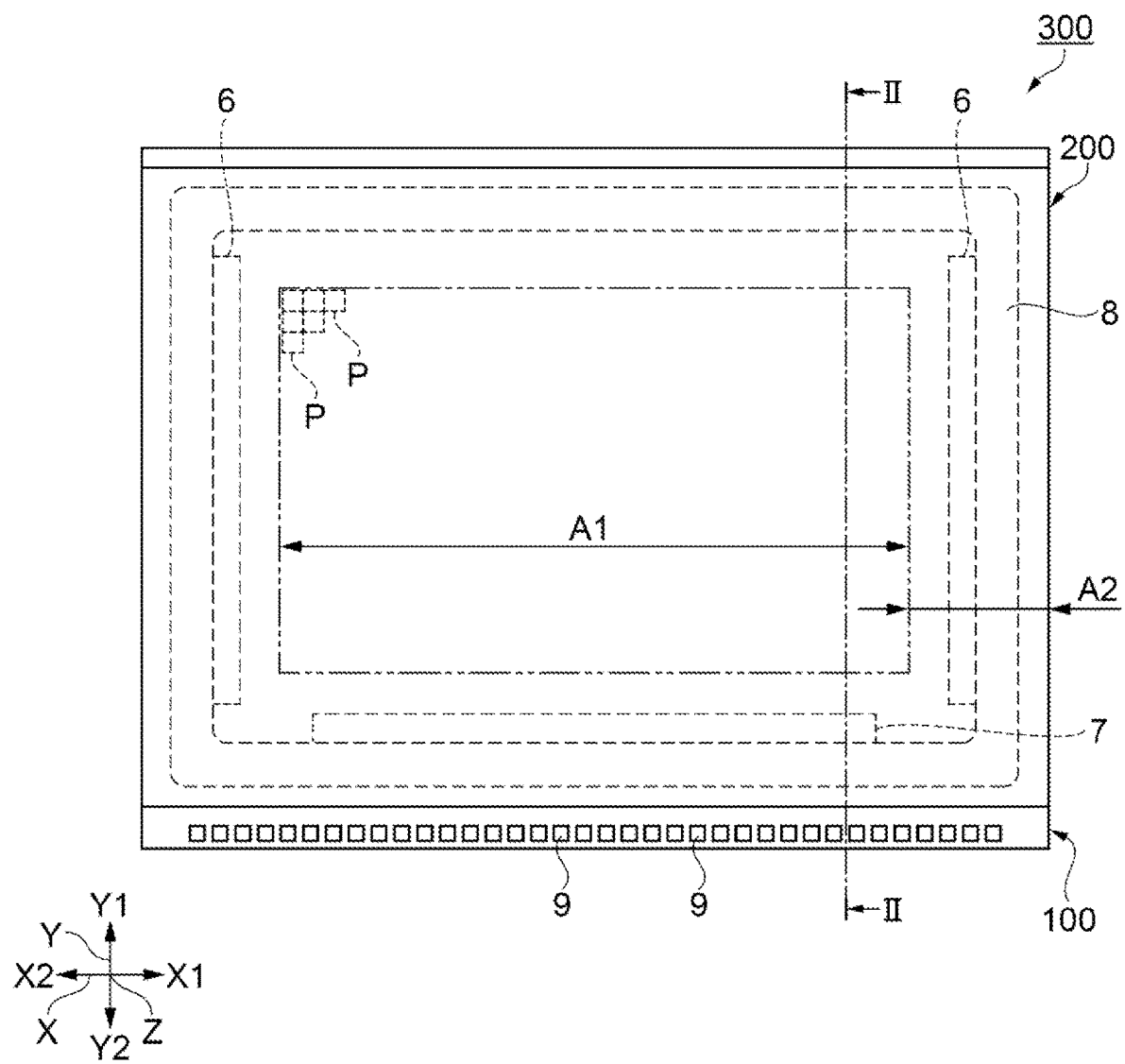
FIG. 1 is a plan view of an electro-optical device according to Embodiment 1.
Figure 2:
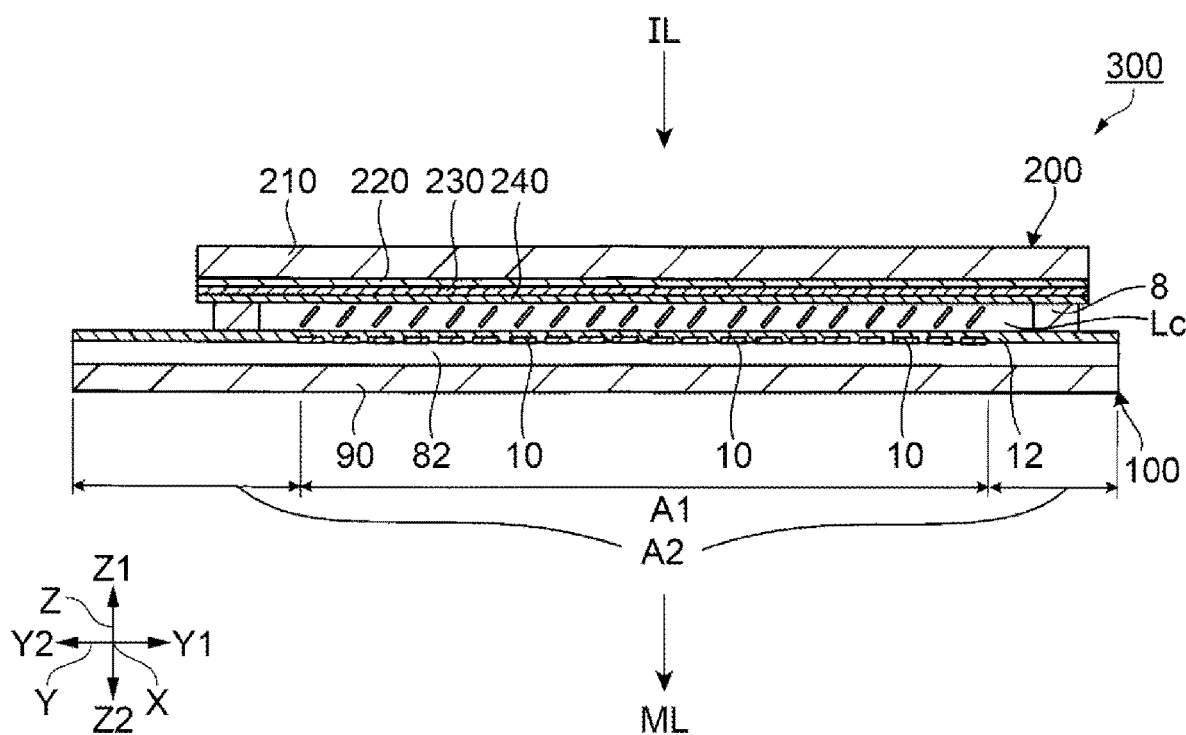
FIG. 2 is a cross-sectional view of the electro-optical device taken along line II-II in FIG. 1.

A structure of a liquid crystal device as an electro-optical device according to the embodiment will be described with reference to FIGS. 1 and 2. FIG. 1 is a plan view of an electro-optical device according to Embodiment 1, and illustrates a schematic plan configuration of a transmissive liquid crystal device 300 as the electro-optical device. FIG. 2 is a cross-sectional view of the electro-optical device taken along line II-II in FIG. 1, and illustrates a schematic cross-sectional configuration of the liquid crystal device 300.

As illustrated in FIGS. 1 and 2, the liquid crystal device 300 includes an element substrate 100 having a light transmitting property, a counter substrate 200 having a light transmitting property, a frame-shaped sealing member 8, and a liquid crystal layer Lc. The term "light transmitting property" refers to transparency to visible light, and means that a transmittance of visible light is preferably 50% or more.

The liquid crystal device 300 includes a display region A1 for displaying an image and an outer region A2 located outside the display region A1 in plan view. A plurality of pixels P arranged in a matrix pattern are provided in the display region A1. Although a shape of the liquid crystal device 300 illustrated in FIG. 1 is quadrangular, it may be circular, for example.

As illustrated in FIG. 2, the element substrate 100 and the counter substrate 200 are disposed with the liquid crystal layer Lc interposed therebetween.

In the embodiment, the counter substrate 200 is disposed on the light incident side of the liquid crystal layer Lc, and the element substrate 100 is disposed on the light emitting side of the liquid crystal layer Lc. Incident light IL incident on the counter substrate 200 is modulated by the liquid crystal layer Lc and is emitted from the element substrate 100 as modulated light ML.

The element substrate 100 includes a base body 90, a plurality of interlayer insulating layers including an interlayer insulating layer 82, a pixel electrode 10, and an alignment film 12. Although not illustrated, a lens layer 34 which will be described below is provided between the pixel electrode 10 and the interlayer insulating layer 82.

The base body 90 is a flat plate having a light transmitting property and an insulation property. The base body 90 is, for example, a glass substrate or a quartz substrate. The transistor 1 which will be described below is disposed between the plurality of interlayer insulating layers.

The pixel electrode 10 has a light transmitting property. The pixel electrode 10 includes a transparent conductive material such as indium tin oxide (ITO), indium zinc oxide (IZO) and fluorine-doped tin oxide (FTO).

A thickness-wise direction of the pixel electrode 10 coincides with the Z1 direction or the Z2 direction. The alignment film 12 has a light transmitting property and an insulation property. The alignment film 12 aligns liquid crystal molecules of the liquid crystal layer Lc. Examples of a material of the alignment film 12 include silicon oxide and polyimide.

The counter substrate 200 is a substrate disposed to face the element substrate 100. The counter substrate 200 has a base body 210, an insulating layer 220, a common electrode 230 and an alignment film 240.

The base body 210 is a flat plate having a light transmitting property and an insulation property. The base body 210 is, for example, a glass substrate or a quartz substrate. The insulating layer 220 has a light transmitting property and an insulating property. A material of the insulating layer 220 is an inorganic material such as silicon oxide. The common electrode 230 is an electrode disposed to face a plurality of pixel electrodes 10, and is also referred to as a counter electrode. The common electrode 230 includes a transparent conductive material such as ITO, IZO, and FTO. The common electrode 230 and the pixel electrode 10 apply an electric field to the liquid crystal layer Lc. The alignment film 240 has a light transmitting property and an insulating property.

The sealing member 8 is disposed between the element substrate 100 and the counter substrate 200. The sealing member 8 is formed using an adhesive containing various types of curable resins such as epoxy resin, for example. The sealing member 8 may include a gap material made of an inorganic material such as glass.

The liquid crystal layer Lc is disposed in a region surrounded by the element substrate 100, the counter substrate 200, and the sealing member 8. The liquid crystal layer Lc is disposed between the plurality of pixel electrodes 10 and the common electrode 230. The liquid crystal layer Lc is an electro-optical layer of which optical characteristics change in accordance with an electric field. The liquid crystal layer Lc contains liquid crystal molecules having positive or negative dielectric anisotropy. The alignment of the liquid crystal molecules changes according to an electric field applied to the liquid crystal layer Lc. The liquid crystal layer Lc modulates the incident light IL in accordance with the applied electric field.

As illustrated in FIG. 1, a plurality of scanning line driving circuits 6, a data line driving circuit 7, and a plurality of external terminals 9 are disposed in the outer region A2 of the element substrate 100. Some of the plurality of external terminals 9 are connected to the scanning line driving circuit 6 or the data line driving circuit 7 via wiring (not illustrated). Further, the plurality of external terminals 9 include a terminal to which a common potential is applied from the outside.

1.2. Electrical Configuration of Element Substrate

Figure 3:
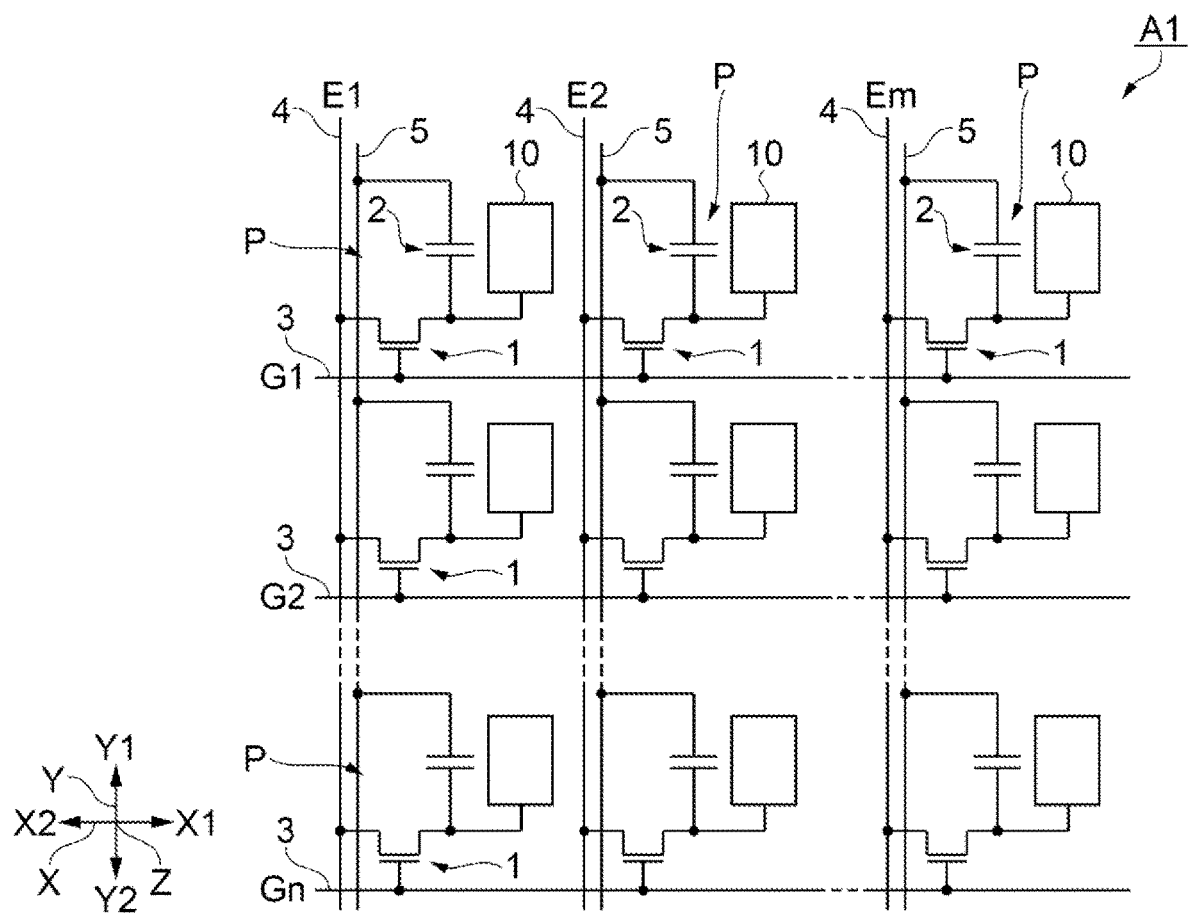
FIG. 3 is an equivalent circuit diagram illustrating an electrical configuration of an element substrate.

FIG. 3 is an equivalent circuit diagram illustrating an electrical configuration of the element substrate.

As illustrated in FIG. 3, a plurality of transistors 1 as switching elements, n scanning lines 3, m data lines 4, and m capacitance lines 5 are provided in the display region A1 of the element substrate 100. Both n and m are integers of 2 or greater. The transistors 1 are disposed corresponding to each intersection of n scanning lines 3 and m data lines 4.

Each of the n scanning lines 3 extends in the X1 direction, and the n scanning lines 3 are arranged at equal intervals in the Y1 direction. Each of the n scanning lines 3 is electrically connected to the gate electrodes of the corresponding transistors 1. The n scanning lines 3 are electrically connected to the scanning line driving circuit 6 illustrated in FIG. 1. As shown in FIG. 3, scanning signals G1, G2, . . .

, and Gn are line-sequentially supplied from the scanning line driving circuit 6 to the 1 to n scanning lines 3.

Each of the m data lines 4 extends in the Y1 direction, and the m data lines 4 are arranged at equal intervals in the X1 direction. Each of the m data lines 4 is electrically connected to source regions of the corresponding transistors 1. The m data lines 4 are electrically connected to the data line driving circuit 7 illustrated in FIG. 1. As illustrated in FIG. 3, image signals E1, E2, . . . , and Em are supplied in parallel from the data line driving circuit 7 to the 1 to m data lines 4.

The n scanning lines 3 and the m data lines 4 are electrically insulated from each other and are disposed in a lattice-like pattern in plan view. A region surrounded by two adjacent scanning lines 3 and two adjacent data lines 4 corresponds to a pixel P.

The pixel electrode 10 is provided for each of the pixels P. The pixel electrode 10 is electrically connected to a drain of the transistor 1.

Each of the m capacitance lines 5 extends in the Y1 direction, and the m capacitance lines 5 are arranged at equal intervals in the X1 direction. In addition, the m capacitance lines 5 are electrically insulated from the m data lines 4 and the n scanning lines 3 and are disposed with a gap therebetween. A fixed potential such as a common potential or a ground potential is applied to each of the capacitance lines 5.

One electrode of a capacitance element 2 is electrically connected to the capacitance line 5. The other electrode of the capacitance element 2 is electrically connected to the pixel electrode 10 and holds a potential of an image signal supplied to the pixel electrode 10.

1.3. Cross-Sectional Structure of Display Region of

Figure 4:
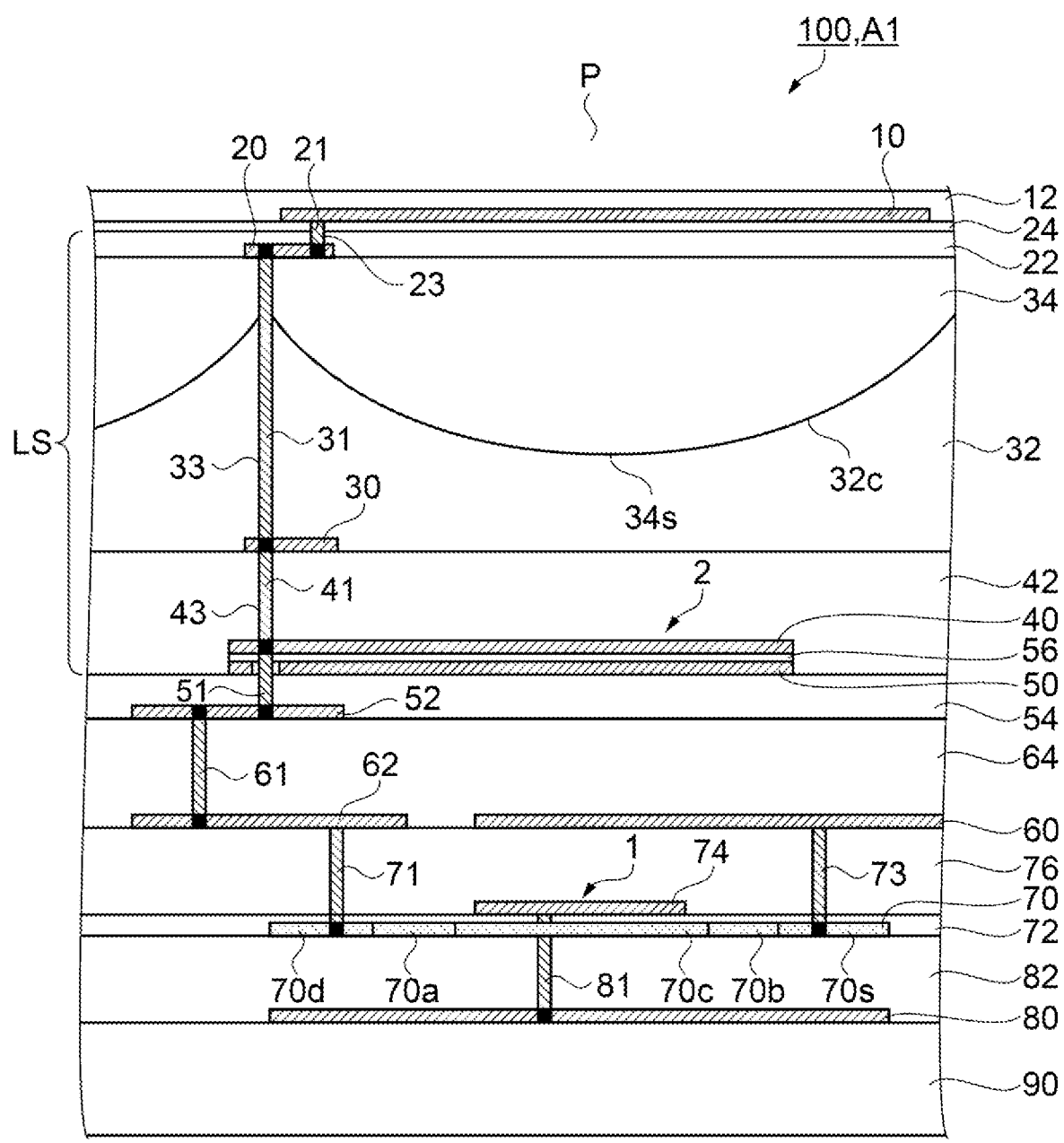
FIG. 4 is an explanatory diagram illustrating a cross-sectional structure of a display region of the element substrate.

Element Substrate FIG. 4 is an explanatory diagram illustrating a cross-sectional structure of the display region of the element substrate, and illustrates a cross-sectional structure of the pixel P provided in the display region A1.

As illustrated in FIG. 4, in the display region A1, the element substrate 100 has a cross-sectional structure in which insulating or conductive functional layers or functional films are stacked in the Z1 direction of the base body 90.

A light shielding layer 80 is disposed between the base body 90 and the interlayer insulating layer 82.

The light shielding layer 80 is formed of a conductive material having a light shielding property. As the conductive material having a light shielding property, for example, a metal such as tungsten (W), titanium (Ti), chromium (Cr), iron (Fe), or aluminum (Al), a metal nitride, or a metal silicide can be used. The light shielding layer 80 constitutes a part of the scanning line 3. The term "light shielding property" means a light shielding property against visible light, means that a transmittance of visible light is preferably less than 50%, and more preferably 10% or less.

The interlayer insulating layer 82 has a light transmitting property and an insulating property. The interlayer insulating layer 82 is formed of, for example, an inorganic material such as silicon oxide.

The transistor 1 is disposed on the interlayer insulating layer 82.

The transistor 1 includes a semiconductor layer 70 having a lightly doped drain (LDD) structure, a gate electrode 74, and a gate insulating layer 72.

The semiconductor layer 70 has a drain region 70*d*, an LDD region 70*a*, a channel region 70*c*, an LDD region 70*b*, and a source region 70*s*.

The channel region 70*c* is located between the source region 70*s* and the drain region 70*d*. The LDD region 70*b* is located between the channel region 70*c* and the source region 70*s*. The LDD region 70*a* is located between the channel region 70*c* and the drain region 70*d*.

The semiconductor layer 70 is made of, for example, polysilicon, and the regions other than the channel region 70*c* are doped with an impurity for increasing conductivity. An impurity concentration in the LDD region 70*b* and the LDD region 70*a* is lower than an impurity concentration in the source region 70*s* and the drain region 70*d*.

A gate electrode 74 is provided on the semiconductor layer 70 via a gate insulating layer 72. The gate electrode 74 overlaps the channel region 70*c* of the semiconductor layer 70. The gate electrode 74 is formed by, for example, doping polysilicon with an impurity that increases conductivity. The gate electrode 74 may be formed using a conductive material such as a metal, a metal silicide, or a metal compound.

The gate insulating layer 72 is made of, for example, a film of silicon oxide formed by a thermal oxidation method, a chemical vapor deposition (CVD) method, or the like.

The gate electrode 74 and the light shielding layer 80 are electrically connected through a contact hole 81 extending through the gate insulating layer 72 and the interlayer insulating layer 82.

A conductive layer 60 and a relay layer 62 are provided on the transistor 1 via the interlayer insulating layer 76. The conductive layer 60 and the relay layer 62 are provided in the same layer and are formed of a light shielding conductive material. The interlayer insulating layer 76 is formed of the same material as that of the interlayer insulating layer 82.

The conductive layer 60 constitutes a part of the data line 4. The conductive layer 60 is electrically connected to the source region 70*s* of the semiconductor layer 70 via a contact hole 73 extending through the interlayer insulating layer 76.

The relay layer 62 is electrically connected to the drain region 70*d* of the semiconductor layer 70 via a contact hole 71 extending through the interlayer insulating layer 76.

An interlayer insulating layer 64 is provided on the conductive layer 60 and the relay layer 62, and a relay layer 52 is provided on the interlayer insulating layer 64. The relay layer 52 is formed of a light shielding conductive material. The interlayer insulating layer 64 is formed of the same material as that of the interlayer insulating layer 82.

The relay layer 52 is electrically connected to the relay layer 62 through a contact hole 61 extending through the interlayer insulating layer 64.

The capacitance element 2 is provided on the relay layer 52 via an interlayer insulating layer 54.

The capacitance element 2 includes a capacitance electrode 50 provided on the base body 90 side, a capacitance electrode 40 provided on the pixel electrode 10 side, and a dielectric layer 56 provided between the capacitance electrode 50 and the capacitance electrode 40. Both the capacitance electrode 40 and the capacitance electrode 50 are formed of a light shielding conductive material. The interlayer insulating layer 54 is formed of the same material as that of the interlayer insulating layer 82.

The capacitance electrode 50 constitutes a part of the capacitance line 5.

The capacitance electrode 40 is electrically connected to the relay layer 52 via a contact hole 51 extending through the interlayer insulating layer 54, and is electrically connected to the drain region 70*d* of the transistor 1.

An optical functional layer LS including the lens layer 34 is provided between the capacitance electrode 40 and the pixel electrode 10.

The optical functional layer LS is provided to curb light amount loss. Specifically, an optical path of transmitted light is adjusted so that the transmitted light that has passed through the pixel electrode 10 is prevented from colliding with a light shielding material layer such as the data line 4 or the capacitance line 5 and causing loss. The optical functional layer LS includes a light transmitting layer 42, a light transmitting layer 32, a lens layer 34, a light transmitting layer 22, and a protective layer 24.

The light transmitting layer 42 is an optical path length adjusting layer called a path layer for adjusting an optical path length. The light transmitting layer 42 is formed of an inorganic material such as silicon oxide. Further, an upper surface of the light transmitting layer 42 is planarized by chemical mechanical polishing (CMP) or the like.

The light transmitting layer 32 is an optical path length adjusting layer. Also, a concave portion 32c serving as a lens surface 34s of the lens layer 34 is provided in the light transmitting layer 32. The light transmitting layer 32 is formed of an inorganic material such as silicon oxide similarly to the light transmitting layer 42.

The concave portion 32c of the light transmitting layer 32 is formed by etching the light transmitting layer 32 after the light transmitting layer 32 is formed to a thickness of about 10 μm.

The lens layer 34 is provided on the light transmitting layer 32 and has a convex shape along the concave portion 32c. The lens layer 34 is formed of an inorganic material having a refractive index different from that of the light transmitting layer 32, for example, silicon oxynitride. The lens layer 34 is formed by forming a film of silicon oxynitride to fill the concave portion 32c and then planarizing the film by CMP or the like.

The light transmitting layer 22 is provided on the lens layer 34. The light transmitting layer 22 is formed of an inorganic material such as silicon oxide similarly to the light transmitting layer 42. A layer thickness of the light transmitting layer 22 is thinner than a layer thickness of the light transmitting layer 32.

The light transmitting layer 22 is provided to achieve good electrical connecting between the pixel electrode 10 and the contact plug 31. Since the contact hole 33 is provided in a gap between the four pixel electrodes 10, the pixel electrode 10 and the contact plug 31 cannot be directly connected to each other.

Therefore, the pixel electrode 10 and the contact plug 31 are electrically connected to each other through the relay layer 20 provided on the lens layer 34 to overlap the contact plug 31 and the pixel electrode 10 in plan view, and the pixel contact plug 21 provided through the light transmitting layer 22 provided between the relay layer 20 and the pixel electrode 10.

As described above, by providing the light transmitting layer 22 between the relay layer 20 and the pixel electrode 10, the contact plug 31 can be provided in the gap between the four pixel electrodes 10, and a restriction of a layout can be satisfied.

A protective layer 24 is provided on the light transmitting layer 22. The protective layer 24 is made of, for example, an inorganic material having light transmitting property and hygroscopicity such as borosilicate glass (BSG). The pixel electrode 10 is provided on the protective layer 24. The alignment film 12 is provided on the pixel electrode 10.

The pixel electrode 10 and the capacitance electrode 40 are electrically connected to each other via a pixel contact plug 21, a relay layer 20, a contact plug 31, a relay layer 30, and a contact plug 41. Thus, the pixel electrode 10 is electrically connected to the drain region 70d of the transistors 1.

The pixel contact plug 21 is provided inside a contact hole 23. The contact hole 23 is provided to extend through the protective layer 24 and the light transmitting layer 22.

The pixel contact plug 21 is formed by filling the inside of the contact hole 23 with a conductive material such as tungsten. The pixel contact plug 21 is in contact with the pixel electrode 10 and the relay layer 20 to electrically connect the pixel electrode 10 and the relay layer 20.

The relay layer 20 is provided between the light transmitting layer 22 and the lens layer 34. When tungsten is used as a material of the pixel contact plug 21, the relay layer 20 is formed of a material, for example, titanium nitride or the like, which provides good electrical conduction with tungsten.

The contact plug 31 is provided inside a contact hole 33. The contact hole 33 is provided to extend through the lens layer 34 and the light transmitting layer 32.

The contact plug 31 is formed by filling the inside of the contact hole 33 with a conductive material such as tungsten. The contact plug 31 is in contact with the relay layer 20 and the relay layer 30 to electrically connect the relay layer 20 and the relay layer 30. Although details will be described below, in the embodiment, the contact hole 33 passes through the relay layer 30 and exposes the contact plug 41 to a bottom surface of the contact hole 33. Therefore, the contact plug 31 is also in contact with the contact plug 41.

The relay layer 30 is provided between the light transmitting layer 32 and the light transmitting layer 42. When tungsten is used as a material of the contact plug 31, the relay layer 30 is formed of a material such as titanium nitride or the like, which provides good electrical conduction with tungsten.

The contact plug 41 is provided inside the contact hole 43. The contact hole 43 is provided to extend through the light transmitting layer 42.

The contact plug 41 is formed by filling the inside of the contact hole 43 with a conductive material such as tungsten. The contact plug 41 is in contact with the relay layer 30, the capacitance electrode 40 and the contact plug 31 to electrically connect the relay layer 30, the contact plug 31 and the capacitance electrode 40.

1.4. Planar Structure of Display Region of Element Substrate

Figure 5:
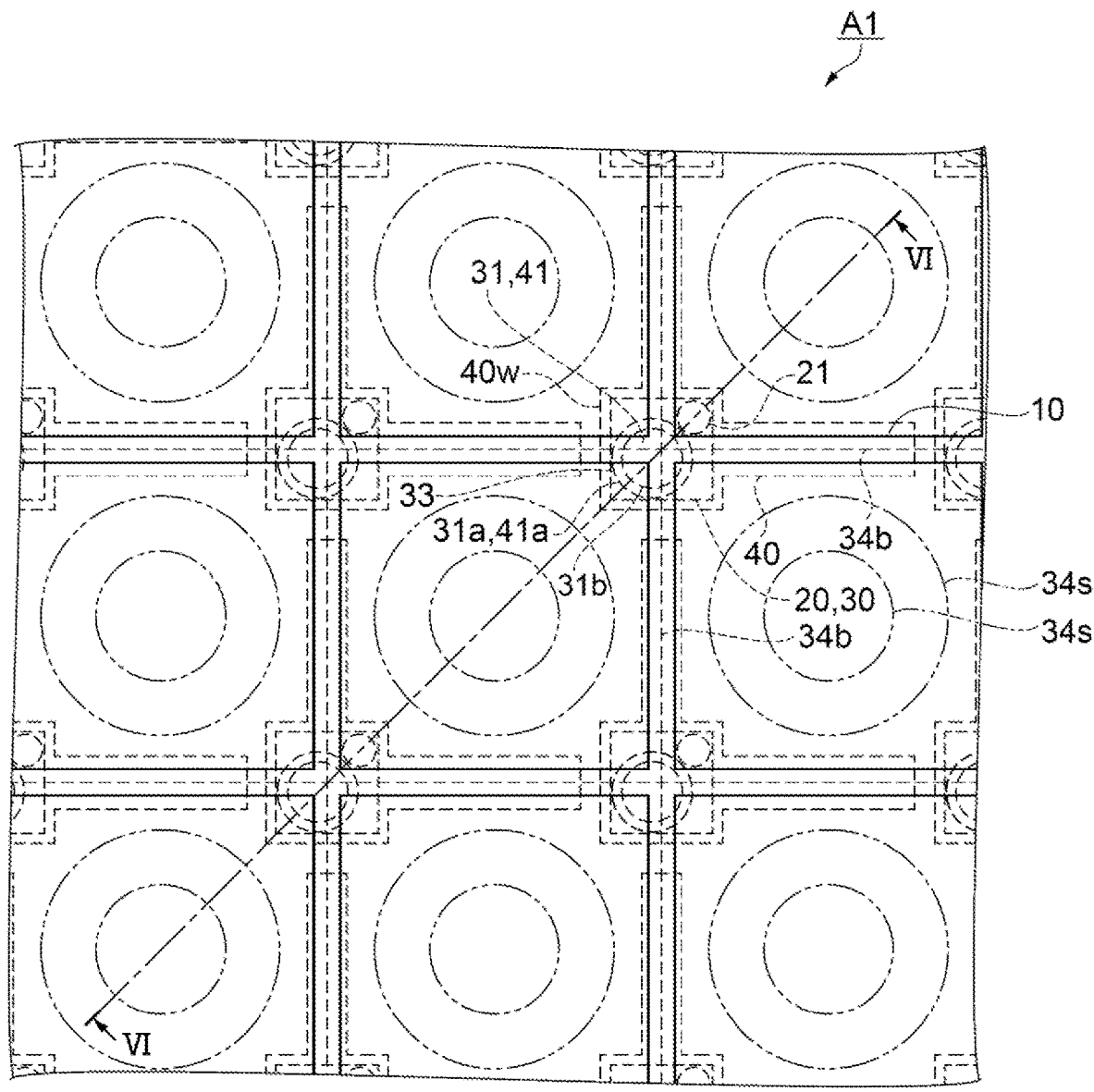
FIG. 5 is a plan view illustrating a part of the display region of the element substrate.

FIG. 5 is a plan view illustrating a part of the display region of the element substrate, and is a view of the display region A1 of the element substrate 100 when seen from the liquid crystal layer Lc side in the Z2 direction. In FIG. 5, the pixel electrode 10 is drawn with a solid line, and a configuration included in the optical functional layer LS provided closer to the base body 90 than the pixel electrode 10 is drawn with a broken line. In addition, in the plan view illustrated below, a curved surface shape of the lens surface 34s is indicated by a double circle of a two dot chain line, and a boundary at which two adjacent lens surfaces 34s are in contact with each other is indicated by a boundary line 34b.

As illustrated in FIG. 5, the pixel electrodes 10 are disposed in a matrix along the X axis and the Y axis.

The pixel contact plug 21 is provided at a position overlapping the pixel electrode 10, in the embodiment, a lower left corner in the drawing among the four corners of the pixel electrode 10.

The relay layer 20 has a rectangular shape. The four corners of the relay layer 20 are provided to respectively overlap the corners of four pixel electrodes 10 adjacent in the X2 direction, the Y2 direction, and the diagonal direction of the pixel electrodes 10.

The pixel contact plug 21 is provided at one of the four corners of the relay layer 20 in plan view.

The contact plug 31 is provided at a position overlapping the relay layer 20 in plan view. In addition, in the embodiment, the contact plug 31 and the pixel contact plug 21 are provided at positions not overlapping each other in plan view. In order to provide the contact plug 31 and the pixel contact plug 21 so as not to overlap each other, the contact plug 31 is provided in the relay layer 20 to be closer to a corner diagonal to the corner at which the pixel contact plug 21 is provided.

When the pixel contact plug 21 is provided at a position not overlapping the contact plug 31 as described above, film formability of the pixel electrode 10 overlapping the pixel contact plug 21 can be improved as compared with a case in which the pixel contact plug 21 is provided at a position overlapping the contact plug 31.

The contact plug 31 has an inverted truncated cone shape. Therefore, an outer edge 31a of an upper surface of the contact plug 31 surrounds the outer side of an outer edge 31b of a bottom surface in plan view.

The relay layer 30 is provided in the same size and shape as the relay layer 20. The relay layer 20 and the relay layer 30 substantially completely overlap each other in plan view.

The contact plug 41 is provided at a position overlapping the contact plug 31. More specifically, an outer edge 41a of the contact plug 41 and the outer edge 31a of the contact plug 31 substantially completely overlap each other in plan view.

Each of the capacitance electrodes 40 includes a wide portion 40w provided at an L-shaped corner, an extending portion extending from the wide portion 40w in the X1 direction to overlap the scanning line 3, and an extending portion extending from the wide portion 40w in the Y1 direction to overlap the date line 4.

The wide portion 40w is provided to overlap the contact hole 33, the contact hole 43, and the contact hole 51. Further, the wide portion 40w is provided in a shape that substantially completely overlaps the relay layer 20.

In the embodiment, a location at which the boundary line 34b intersects and the contact plug 31 overlap each other. This indicates that the contact plug 31 is provided to extend through the lens surface 34s of the lens layer 34. The boundary line 34b drawn inside the contact hole 33 is intended to indicate that the lens surface 34s is provided without any gap, and the lens surface 34s is not present inside the contact hole 33.

Figure 6:
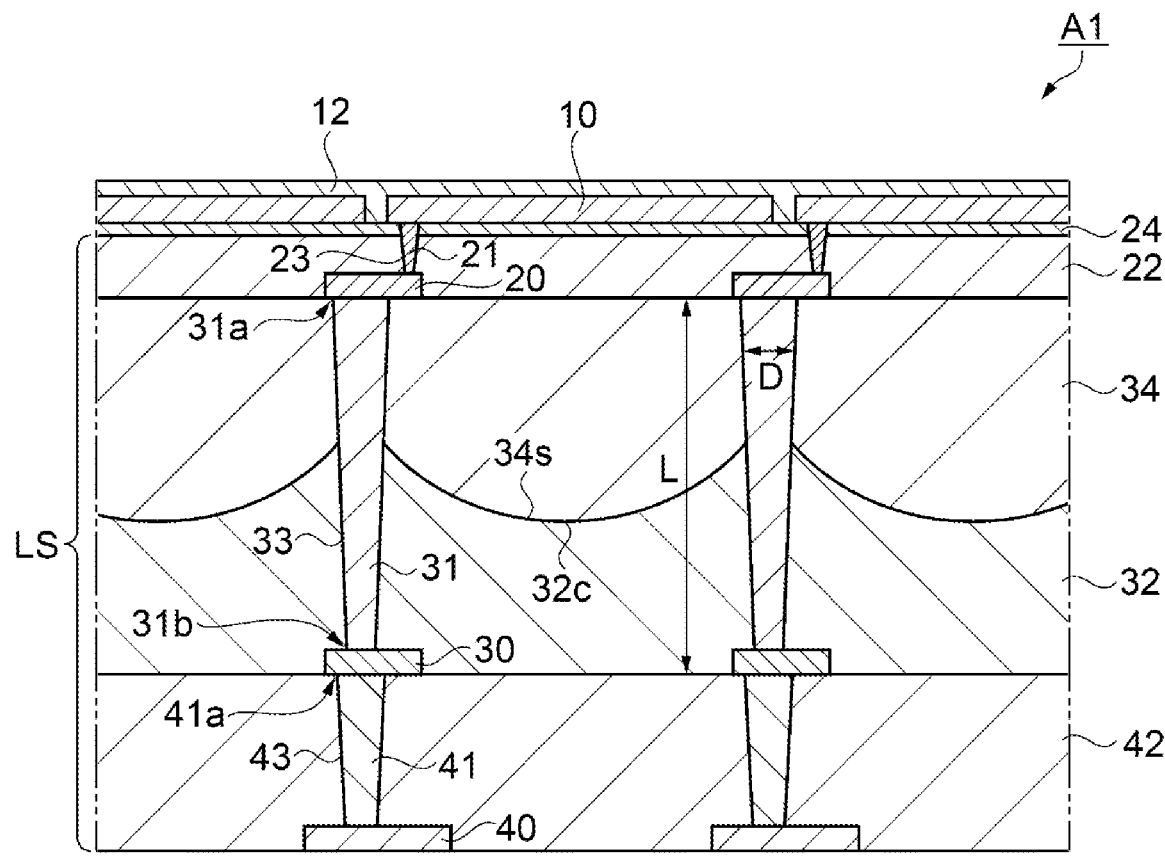
FIG. 6 is a cross-sectional view taken along line VI-VI in FIG. 5.

1.5. Structure of Optical Functional Layer in Display Region of Element Substrate FIG. 6 is a cross-sectional view taken along line VI-VI in FIG. 5 and shows a cross-sectional structure of the optical functional layer LS. As illustrated in FIG. 6, the contact hole 33 passes through the lens layer 34 and the light transmitting layer 32.

An aspect ratio of the contact hole 33 is about two times or more higher than an aspect ratio of other contact holes, for example, the contact hole 43. In the embodiment, since a depth L of the contact hole 33 is about 5 to 10 μm, and an inner diameter D of the contact hole 33 is about 1 μm, the aspect ratio L/D is about 5 to 10.

The contact hole 33 is formed by anisotropic etching such as dry etching. It is difficult to stop the etching at a position at which the lens layer 34 and the light transmitting layer 32 are penetrated and then an upper surface of the relay layer 30 is exposed. Therefore, although not illustrated, a concave portion may be formed in the upper surface of the relay layer 30 by over-etching of the contact hole 33.

In order to ensure electrical connecting via the contact hole 33, the contact hole 33 is provided at a position overlapping the contact plug 41 in plan view. As a result, when the contact hole 33 is formed by etching, the bottom of the contact hole 33 is formed in the contact plug 41 even when the contact hole 33 passes through a part of the relay layer 30. Therefore, since the contact plug 31 filled in the contact hole 33 is in direct contact with the contact plug 41, the electrical connecting between the contact plug 31 and the contact plug 41 can be reliably achieved.

Figure 7:
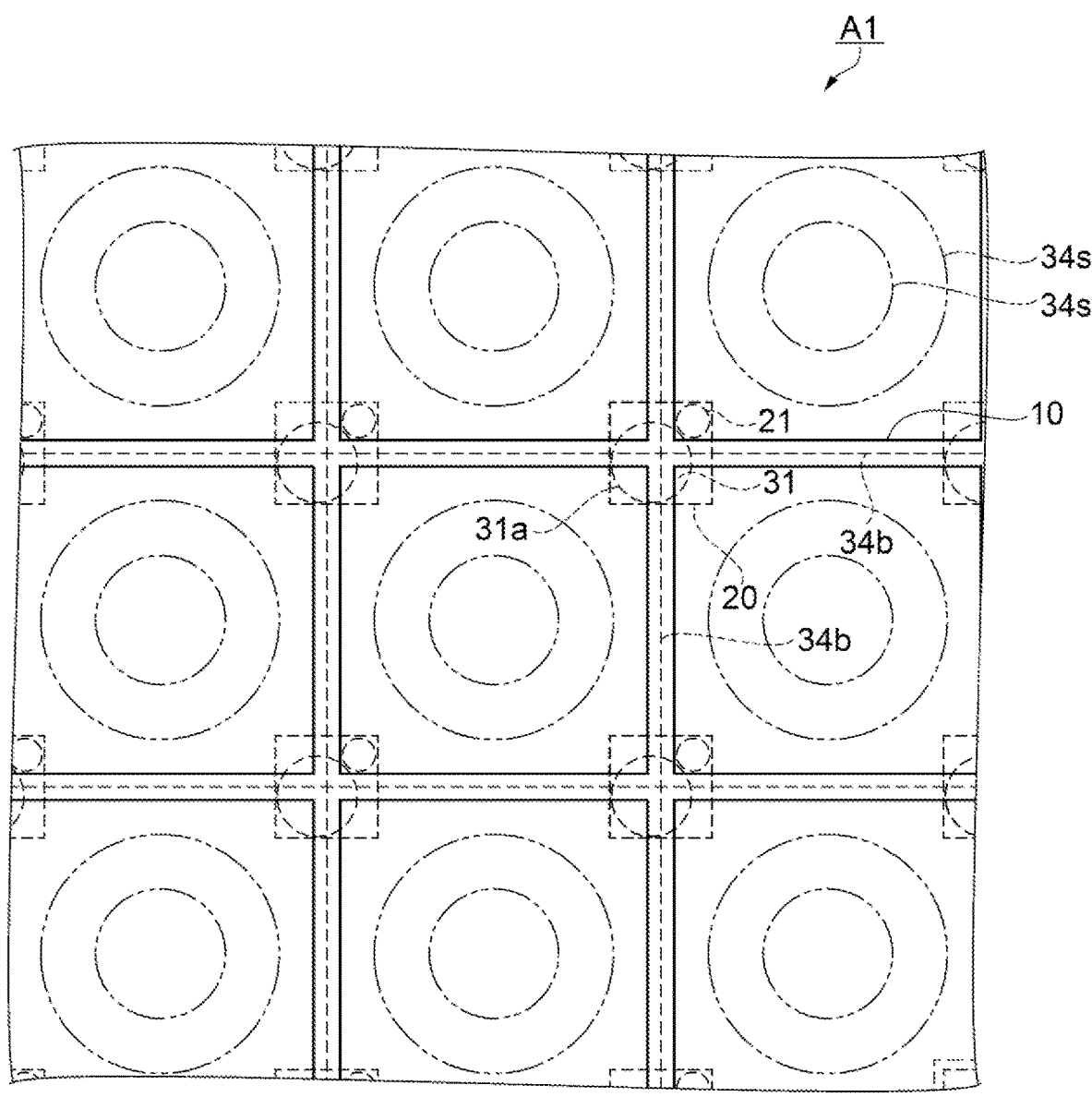
FIG. 7 is a plan view illustrating a part of the display region of the element substrate.

FIG. 7 is a plan view illustrating a part of the display region of the element substrate, and illustrates a layout of the pixel electrode 10, the pixel contact plug 21, the relay layer 20, and the contact plug 31 when the pixel electrode 10 is seen from the liquid crystal layer Lc side in the Z2 direction in the plan view of the display region A1 of FIG. 5. In FIG. 7, the pixel electrode 10 is indicated with a solid line.

As illustrated in FIG. 7, the pixel contact plug 21 and the contact plug 31 are provided at positions overlapping the relay layer 20 in plan view. The pixel contact plug 21 is provided not to overlap the contact plug 31 in plan view. The pixel contact plug 21 and the contact plug 31 are disposed close to diagonal corners of the relay layer 20 so that the pixel contact plug 21 and the contact plug 31 do not overlap each other in plan view.

Figure 8:
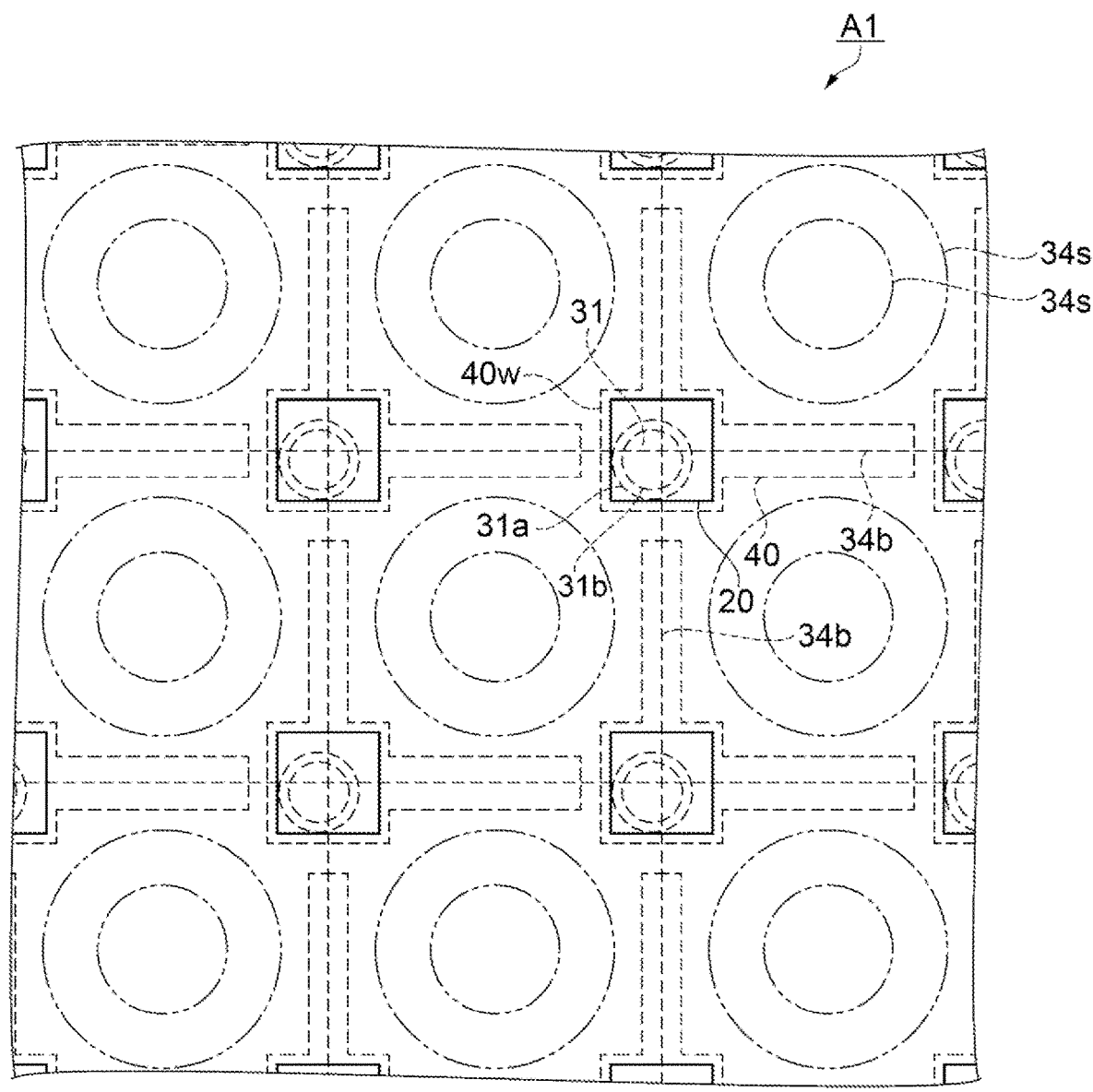
FIG. 8 is a plan view illustrating a part of the display region of the element substrate.
Figure 8:
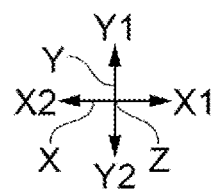

FIG. 8 is a plan view illustrating a part of the display region of the element substrate, and illustrates a layout of the relay layer 20, the contact plug 31, and the capacitance electrode 40 when the relay layer 20 is seen from the liquid crystal layer Lc side in the Z2 direction in the plan view of the display region A1 of FIG. 5. In FIG. 8, the relay layer 20 is indicated with a solid line.

As illustrated in FIG. 8, the relay layer 20 substantially completely overlaps the wide portions 40w of the capacitance electrode 40 in plan view.

Regarding the boundary line 34b indicating a boundary at which two adjacent lens surfaces 34s are in contact with each other, an intersection of two boundary lines 34b along the X axis and the Y axis is located inside the outer edge 31b and the outer edge 31a of the contact plug 31. Therefore, the contact hole 33 is provided to extend through the lens surface 34s of the lens layer 34.

The lens surface 34s may be formed so that the boundary line 34b of the lens surface 34s and the contact hole 33 do not overlap each other in plan view. In this case, since the lens surface 34s is not formed at the position at which the contact hole 33 is provided, the contact hole 33 is provided only in the light transmitting layer 32 between four adjacent lens surfaces 34s without extending through the lens layer 34.

Figure 9:
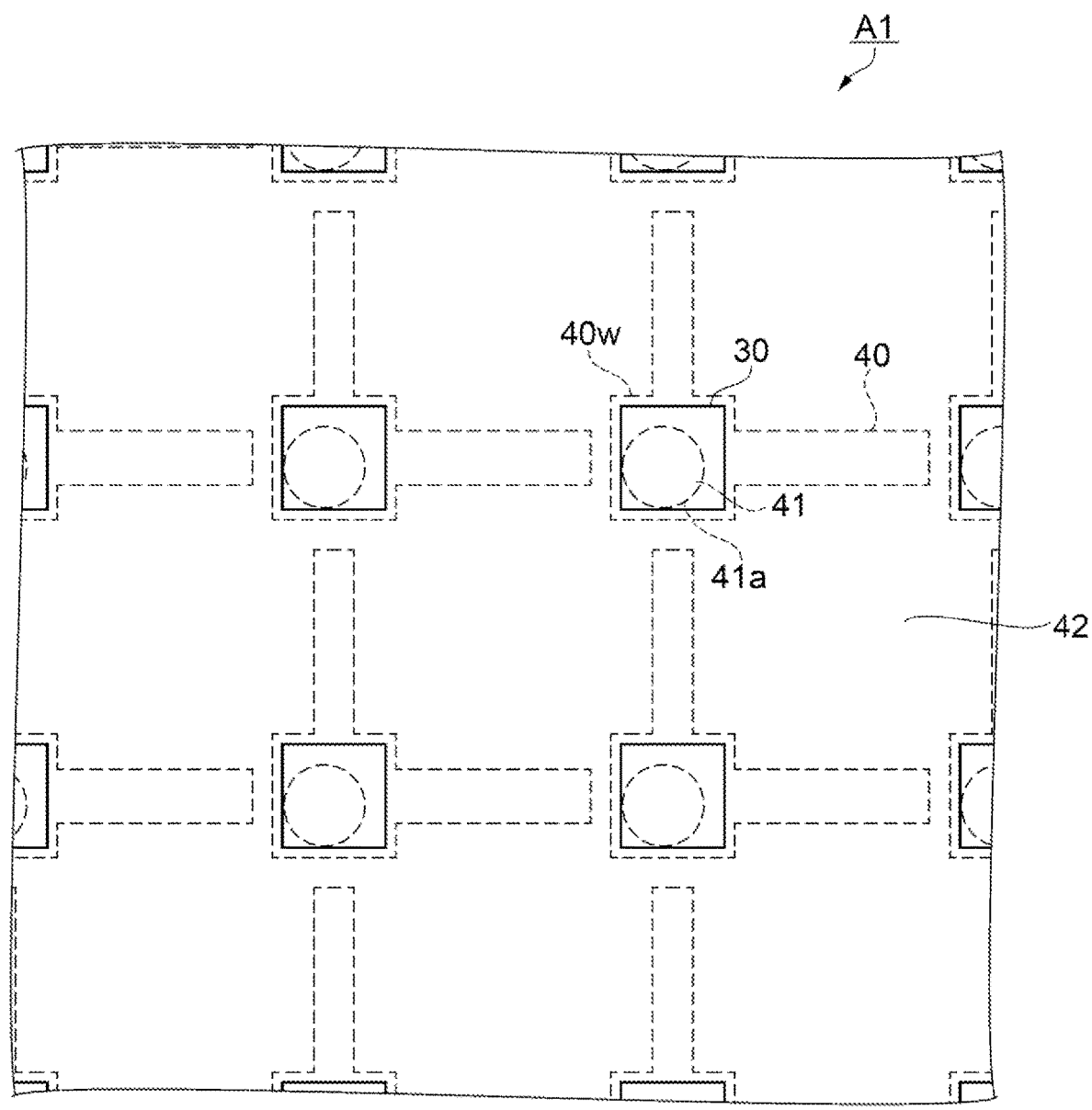
FIG. 9 is a plan view illustrating a part of the display region of the element substrate.

FIG. 9 is a plan view illustrating a part of the display region of the element substrate, and illustrates a layout of the relay layer 30, the contact plugs 41, and the capacitance electrode 40 when the relay layer 30 is seen from the liquid crystal layer Lc side in the Z2 direction in the plan view of the display region A1 of FIG. 5. In FIG. 9, the relay layer 30 is indicated with a solid line.

As illustrated in FIG. 9, similarly to the relay layer 20, the relay layer 30 substantially completely overlaps the wide portion 40w of the capacitance electrode 40. The contact plug 41 is provided at a position overlapping the relay layer 30 so that an outer edge 41a of the contact plug 41 does not protrude from the relay layer 30 in plan view.

Figure 10:
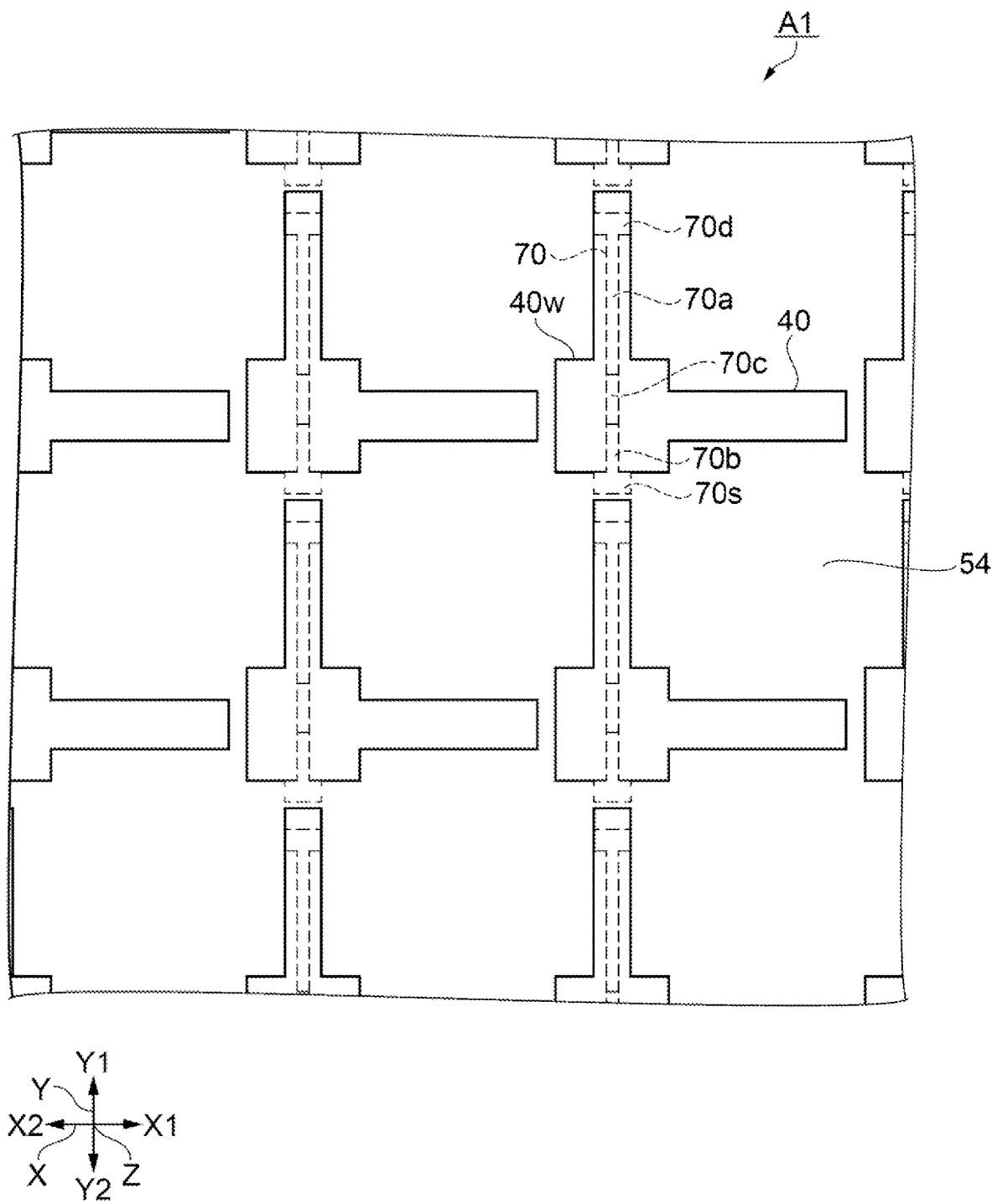
FIG. 10 is a plan view illustrating a part of the display region of the element substrate.

FIG. 10 is a plan view illustrating a part of the display region of the element substrate, and illustrates a layout of the capacitance electrodes 40 and the semiconductor layer 70 when the capacitance electrode 40 is seen from the liquid crystal layer Lc side in the Z2 direction in the plan view of the display region A1 of FIG. 5. In FIG. 10, the capacitance electrode 40 is indicated with a solid line.

As illustrated in FIG. 10, the capacitance electrode 40 is provided at a position overlapping the semiconductor layer 70 in plan view. The wide portion 40w of the capacitance electrode 40 is provided at a position overlapping the channel region 70c of the semiconductor layer 70 and function as a light shielding layer for the channel region 70c of the semiconductor layer 70.

As described above, the liquid crystal device 300 as the electro-optical device according to the embodiment includes the transistor 1, the pixel electrode 10 provided corresponding to the transistor 1, the lens layer 34 provided in a layer between the transistor 1 and the pixel electrode 10, the capacitance electrode 40 provided in a layer between the transistor 1 and the lens layer 34, and the relay layer 20 provided in a layer between the capacitance electrode 40 and the pixel electrode 10 to be electrically connected to the capacitance electrode 40 via the contact hole 43 and electrically connected to the pixel electrode 10 via the contact hole 23, wherein the relay layer 20 is provided in a region overlapping the capacitance electrode 40 in plan view.

As described above, the relay layer 20 is provided in a region overlapping the capacitance electrode 40 in plan view. Therefore, it is possible to improve the reliability of the electrical connecting between the pixel electrode 10 and the transistor 1 while the restriction on the layout is satisfied.

The liquid crystal device 300 according to the embodiment further includes the contact plug 41 provided inside the contact hole 43 and the pixel contact plug 21 provided inside the contact hole 23, and the contact plug 41 and the pixel contact plug 21 are provided in a region overlapping the capacitance electrode 40 in plan view.

In this way, the contact plug 41 and the pixel contact plug 21 are provided to partially overlap the capacitance electrode 40 in plan view. As a result, the restriction on the layout is satisfied, and thus a structure suitable for miniaturization can be obtained.

In the liquid crystal device 300 according to the embodiment, the contact plug 41 and the pixel contact plug 21 are provided at positions not overlapping each other in plan view.

In this way, the pixel contact plug 21 is provided not to overlap the contact plug 41 in plan view. As a result, the restriction on the layout is satisfied, and thus a structure suitable for miniaturization can be obtained.

The liquid crystal device 300 according to the embodiment further includes the light transmitting layer 42 having the contact hole 43 in a layer between the capacitance electrode 40 and the relay layer 20.

As described above, the light transmitting layer 42 having the contact hole 43 is provided in the layer between the capacitance electrode 40 and the relay layer 20. Since the light transmitting layer 42 functions as the optical path length adjusting layer as described above, the optical performance of the optical functional layer LS including the lens layer 34 can be improved.

In the liquid crystal device 300 according to the embodiment, a light transmitting layer including the light transmitting layer 22 as an insulating layer and the protective layer 24 is further provided in a layer between the relay layer 20 and the pixel electrode 10, and the contact hole 23 is provided to extend through the light transmitting layer 22 and the protective layer 24.

As described above, the contact hole 23 is provided to extend through the light transmitting layer 22 and the protective layer 24. Therefore, the pixel electrode 10 and the transistor 1 can be satisfactorily electrically connected to each other while the restriction on the layout is satisfied.

The liquid crystal device 300 according to the embodiment further includes the light transmitting layer 32 provided in a layer between the light transmitting layer 42 and the relay layer 20, the lens layer 34 is provided in a layer between the light transmitting layer 32 and the relay layer 20, and the lens layer 34 and the light transmitting layer 32 have the contact hole 33 extending through the lens layer 34 and the light transmitting layer 32 in a region overlapping the capacitance electrode 40 in plan view.

As described above, the lens layer 34 and the light transmitting layer 32 have the contact hole 33 extending through the lens layer 34 and the light transmitting layer 32 in a region overlapping the capacitance electrode 40 in plan view. Therefore, it is possible to improve the optical performance of the optical functional layer LS including the lens layer 34 and the light transmitting layer 32, to satisfy the restriction on the layout, and to satisfactorily electrically connect the pixel electrode 10 and the transistor 1 to each other.

The liquid crystal device 300 of the embodiment further includes the contact plug 31 provided inside the contact hole 33.

Therefore, the pixel electrode 10 and the transistor 1 can be satisfactorily electrically connected to each other while the restriction on the layout is satisfied.

The liquid crystal device 300 according to the embodiment further includes the relay layer 30 electrically connected to the layer between the capacitance electrode 40 and the relay layer 20 via the capacitance electrode 40 and the contact hole 43 and electrically connected to the relay layer 20 via the contact hole 33, and the relay layer 30 is provided in a region overlapping the capacitance electrode 40 in plan view.

As described above, the relay layer 30 is provided in a region overlapping the capacitance electrode 40 in plan view. Therefore, the pixel electrode 10 and the transistor 1 can be satisfactorily electrically connected to each other while the restriction on the layout is satisfied.

2. Embodiment 2

Figure 11:
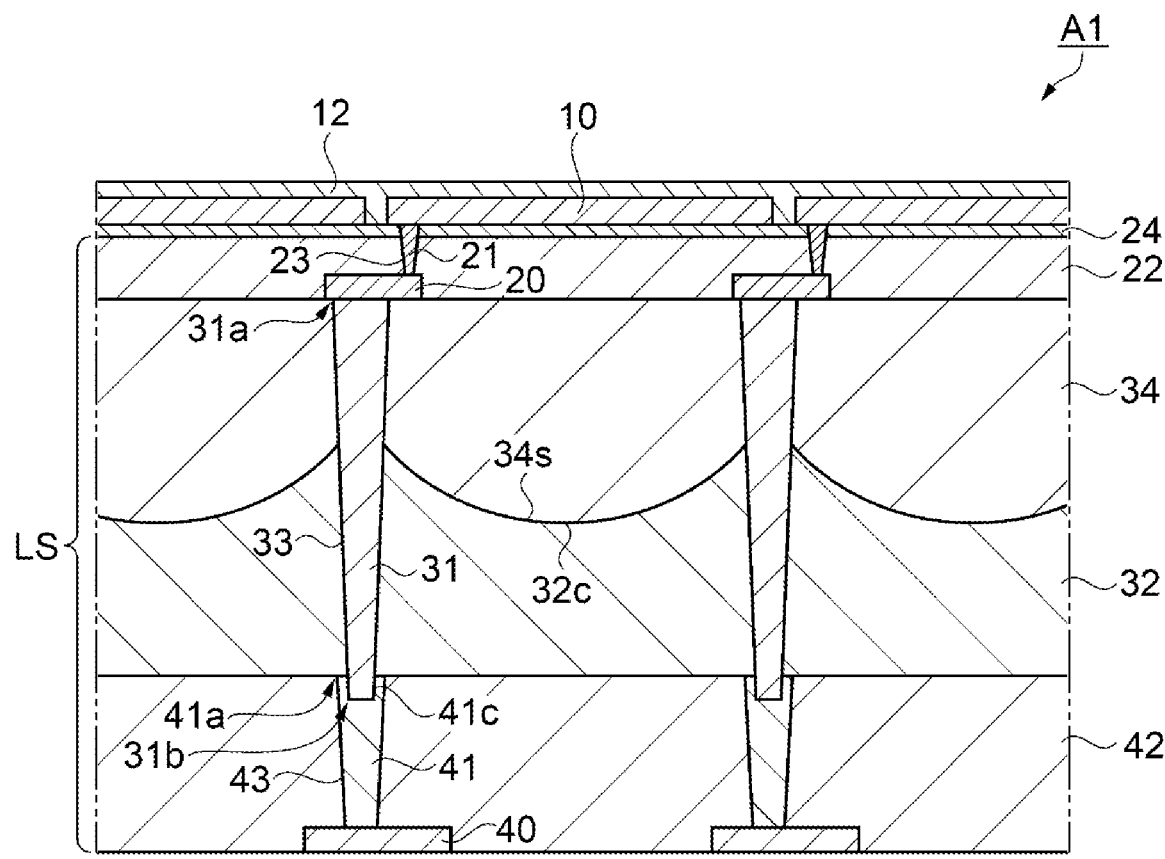
FIG. 11 is a cross-sectional view of an electro-optical device according to Embodiment 2.
Figure 11:
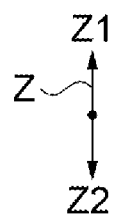
Figure 12:
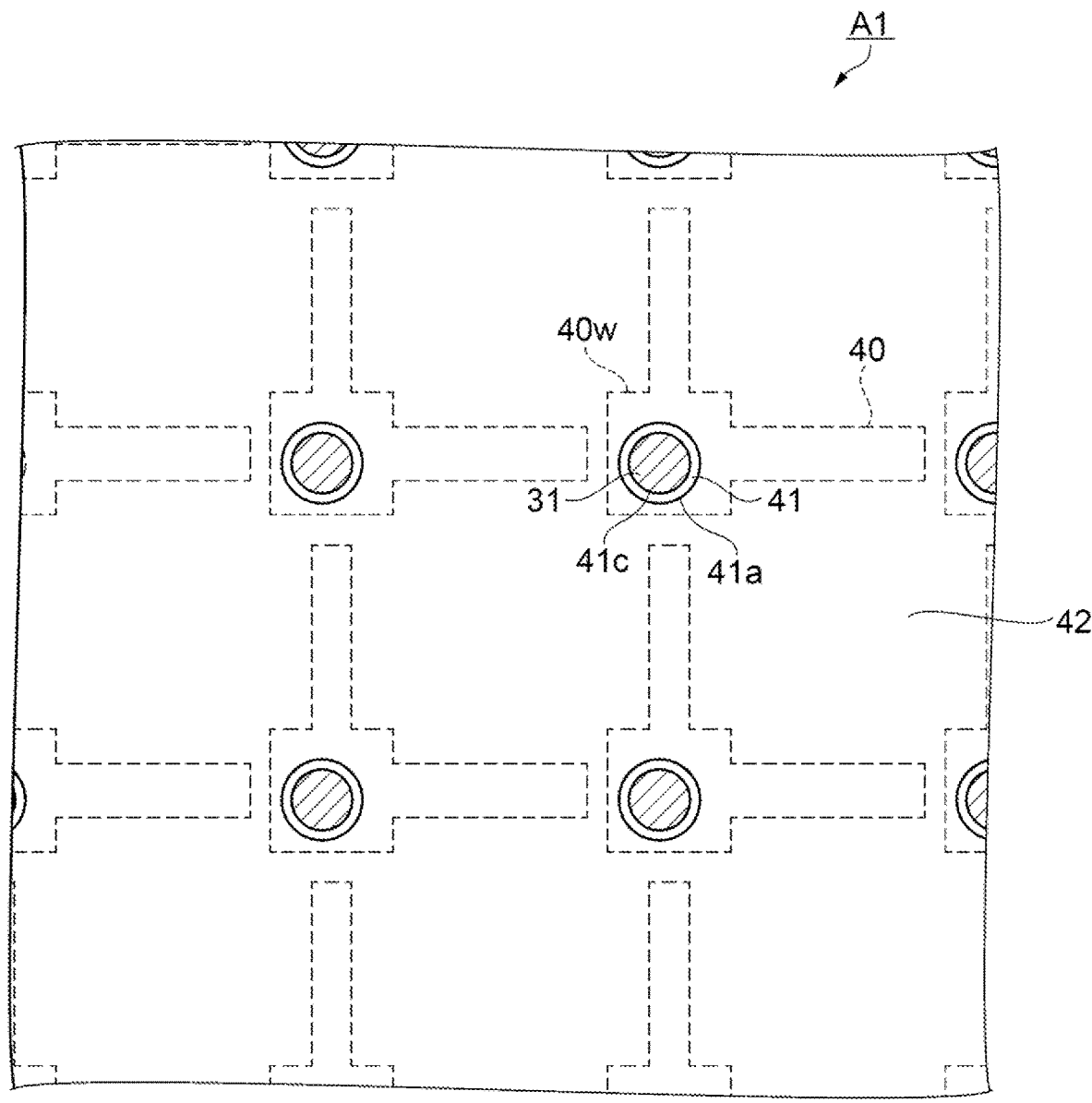
FIG. 12 is a plan view illustrating a part of a display region of an element substrate.
Figure 12:
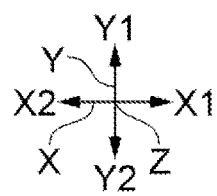

A structure of a liquid crystal device 300 as an electro-optical device according to Embodiment 2 will be described with reference to FIGS. 11 and 12. FIG. 11 is a cross-sectional view of an electro-optical device according to Embodiment 2, and is a view corresponding to FIG. 6 of Embodiment 1. FIG. 12 is a plan view illustrating a part of the display region of an element substrate, and illustrates a layout of the contact plug 41, the contact plug 31, and the capacitance electrode 40 when the upper surface of the contact plug 41 is seen from the liquid crystal layer Lc side in the Z2 direction. In FIG. 12, the contact plug 41 and the contact plug 31 are indicated with a solid line.

Embodiment 2 is different from Embodiment 1 in that the relay layer 30 is not provided and the contact plug 31 and the contact plug 41 are in direct contact with each other. The same reference numerals are given to the same configurations as in Embodiment 1, and the description thereof will be omitted.

As shown in FIG. 11, the contact hole 33 passes through the lens layer 34 and the light transmitting layer 32 to expose the upper surface of the contact plug 41.

A concave portion 41c is formed in the upper surface of the contact plug 41 by over-etching of the contact hole 33. A part of the contact plug 31 filled in the contact hole 33 is filled in the concave portion 41c of the contact plug 41, and the contact plug 31 and the contact plug 41 are in direct contact with each other.

In FIG. 12, a cross section of the contact plug 31 is hatched. As illustrated in FIG. 12, the cross section of the contact plug 31 filling the concave portion 41c of the contact plug 41 is exposed on a surface including the upper surface of the contact plug 41.

In the embodiment, since the relay layer 30 is not provided, the number of steps can be reduced. In addition, in the embodiment, since tungsten is used as a material of both the contact plug 41 and the contact plug 31, the electrical connecting between the contact plug 41 and the contact plug 31 can be performed satisfactorily.

As described above, according to the liquid crystal device 300 as the electro-optical device of the embodiment, the following effects can be obtained in addition to the effects of the above embodiment.

In the liquid crystal device 300 according to the embodiment, the contact plug 31 is provided to be in contact with contact plug 41.

Therefore, it is possible to satisfactorily perform the electrical connecting between the contact plug 31 and the contact plug 41, to satisfy the restriction on the layout, and to satisfactorily electrically connect the pixel electrode 10 and the transistor 1.

3. Embodiment 3

Figure 13:
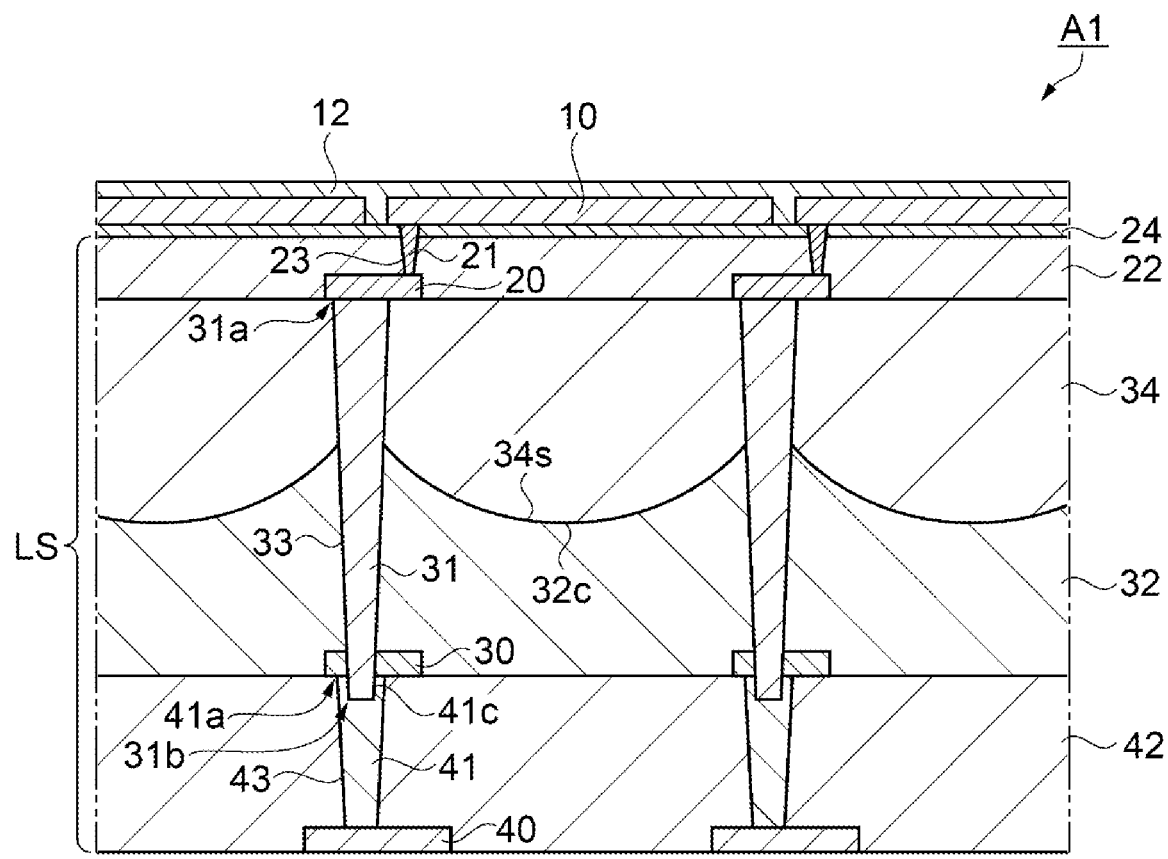
FIG. 13 is a cross-sectional view of an electro-optical device according to Embodiment 3.
Figure 13:
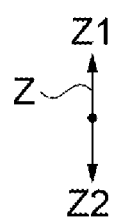

A structure of a liquid crystal device 300 as an electro-optical device according to Embodiment 3 will be described with reference to FIG. 13. FIG. 13 is a cross-sectional view of an electro-optical device according to Embodiment 3, and is a view corresponding to FIG. 6 of Embodiment 1.

Embodiment 3 is different from Embodiment 1 in that the contact plug 31 passes through the relay layer 30 and is in direct contact with the contact plug 41. In addition, the embodiment is different from Embodiment 2 in that a relay layer 30 is provided. The same reference numerals are given to the same configurations as in Embodiment 1 and Embodiment 2, and the description thereof will be omitted.

As illustrated in FIG. 13, the contact hole 33 passes through the lens layer 34, the light transmitting layer 32 and the relay layer 30 to expose the upper surface of the contact plug 41.

A concave portion 41c is formed in an upper surface of the contact plug 41 by over-etching of the contact hole 33.

A part of the contact plug 31 filling the contact hole 33 fills the concave portion 41c of the contact plug 41, and the contact plugs 31 and 41 are in direct contact with each other.

In the embodiment, since tungsten is used as a material of both the contact plug 41 and the contact plug 31, the electrical connecting between the contact plug 41 and the contact plug 31 can be satisfactorily performed.

As described above, according to the liquid crystal device 300 as the electro-optical device of the embodiment, the following effects can be obtained in addition to the effects of the above embodiment.

In the liquid crystal device 300 according to the embodiment, the contact plug 31 is provided to be in contact with the contact plug 41.

Therefore, it is possible to satisfactorily perform the electrical connecting between the contact plug 31 and the contact plug 41, to satisfy the restriction on the layout, and to satisfactorily electrically connect the pixel electrode 10 and the transistor 1.

Further, in the liquid crystal device 300 of the embodiment, a part of the contact plug 31 is provided within the relay layer 30.

Therefore, it is possible to satisfactorily perform the electrical connecting between the contact plug 31 and the relay layer 30, to satisfy the restriction on the layout, and to satisfactorily electrically connect the pixel electrode 10 and the transistor 1.

4. Embodiment 4

Figure 14:
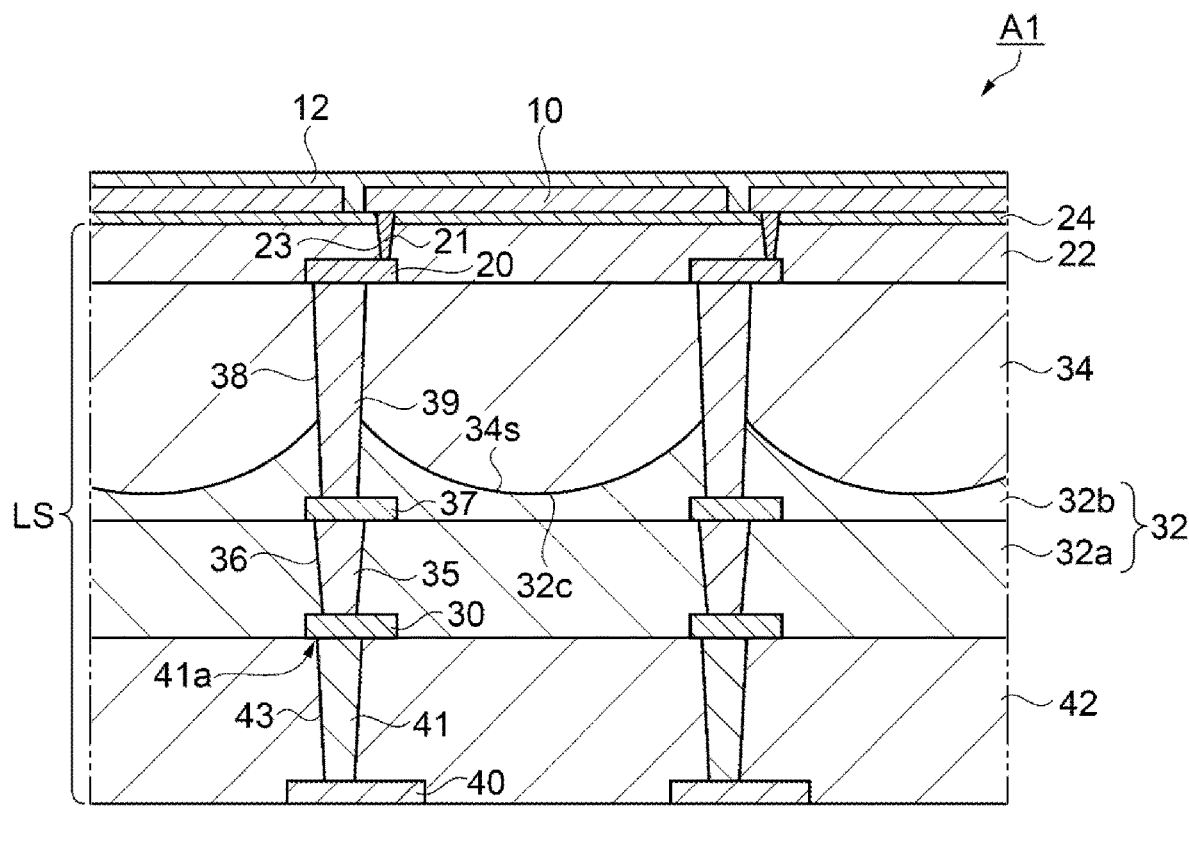
FIG. 14 is a cross-sectional view of an electro-optical device according to Embodiment 4.
Figure 14:
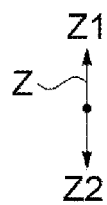

A structure of a liquid crystal device 300 as an electro-optical device according to Embodiment 4 will be described with reference to FIG. 14. FIG. 14 is a cross-sectional view of an electro-optical device according to Embodiment 4, and is a view corresponding to FIG. 6 of Embodiment 1.

Embodiment 4 is different from the above-described embodiments in that a relay layer 37 is provided between the relay layer 20 and the relay layer 30. The same reference numerals are given to the same configurations as in each of the above embodiments, and the description thereof will be omitted.

As shown in FIG. 14, the light transmitting layer 32 includes a light transmitting layer 32a and a light transmitting layer 32b stacked on the light transmitting layer 32a.

A contact hole 36 that exposes the relay layer 30 is provided in the light transmitting layer 32a. A contact plug 35 is provided in the contact hole 36.

A relay layer 37 is provided in a region overlapping the contact plug 35, and the light transmitting layer 32b is provided on the relay layer 37. Although not illustrated, the relay layer 37 completely overlaps the relay layer 30 and the capacitance electrode 40 in plan view and has the same size as that of the relay layer 30.

A contact hole 38 that exposes the relay layer 37 is provided in the light transmitting layer 32b. A contact plug 39 is provided in the contact hole 38.

When tungsten is used for a material of the contact plug 35 and the contact plug 39, the relay layer 37 is formed of a material such as titanium nitride or the like that provides good electrical conduction with tungsten.

The sum of a depth of the contact hole 36 and a depth of the contact hole 38 is equivalent to a depth of the contact hole 33 of the above-described embodiment.

In the embodiment, since an aspect ratio of the contact hole 36 and the contact hole 38 can be made smaller than that of the contact hole 33 of the above-described embodiment, the contact hole 36 and the contact hole 38 can be easily formed. Furthermore, since the contact hole 36 and the contact hole 38 can be reliably provided, it is possible to curb occurrence of a problem in the electrical connecting between the relay layer 20 and the relay layer 30.

As described above, according to the liquid crystal device 300 as the electro-optical device of the embodiment, the following effects can be obtained in addition to the effects of the above embodiment.

In the liquid crystal device 300 of the embodiment, the light transmitting layer 32 further includes the light transmitting layer 32a and the light transmitting layer 32b, and the relay layer 37 electrically connected to the relay layer 30 and electrically connected to the relay layer 20 is provided between the light transmitting layer 32a and the light transmitting layer 32b, and the relay layer 37 is provided in a region overlapping the capacitance electrodes 40 in plan view.

As described above, the relay layer 37 is provided in a region overlapping the capacitance electrode 40 in plan view. Therefore, the pixel electrode 10 and the transistor 1 can be satisfactorily electrically connected to each other while the restriction on the layout is satisfied.

5. Embodiment 5

Figure 15:
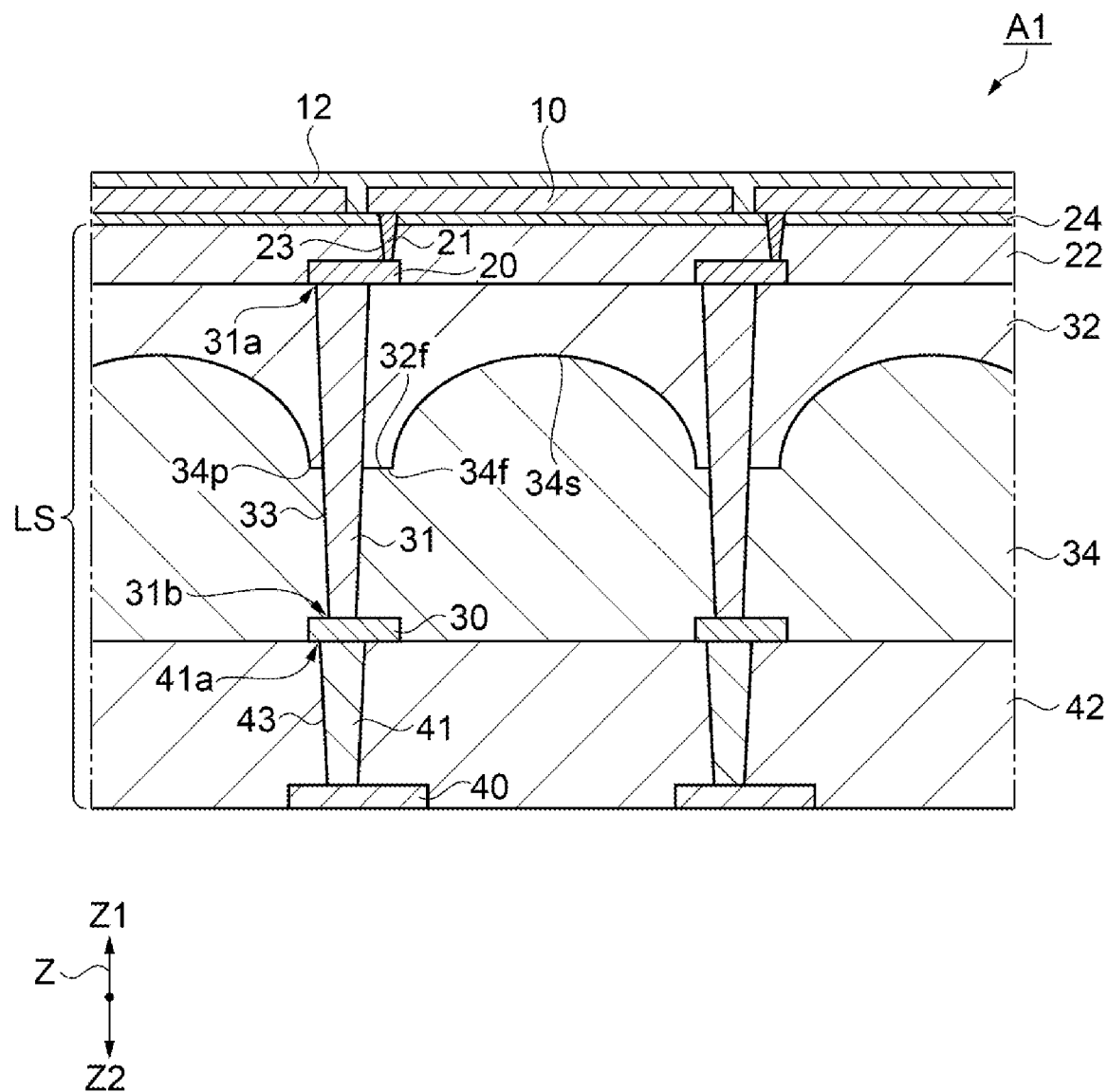
FIG. 15 is a cross-sectional view of an electro-optical device according to Embodiment 5.
Figure 16:
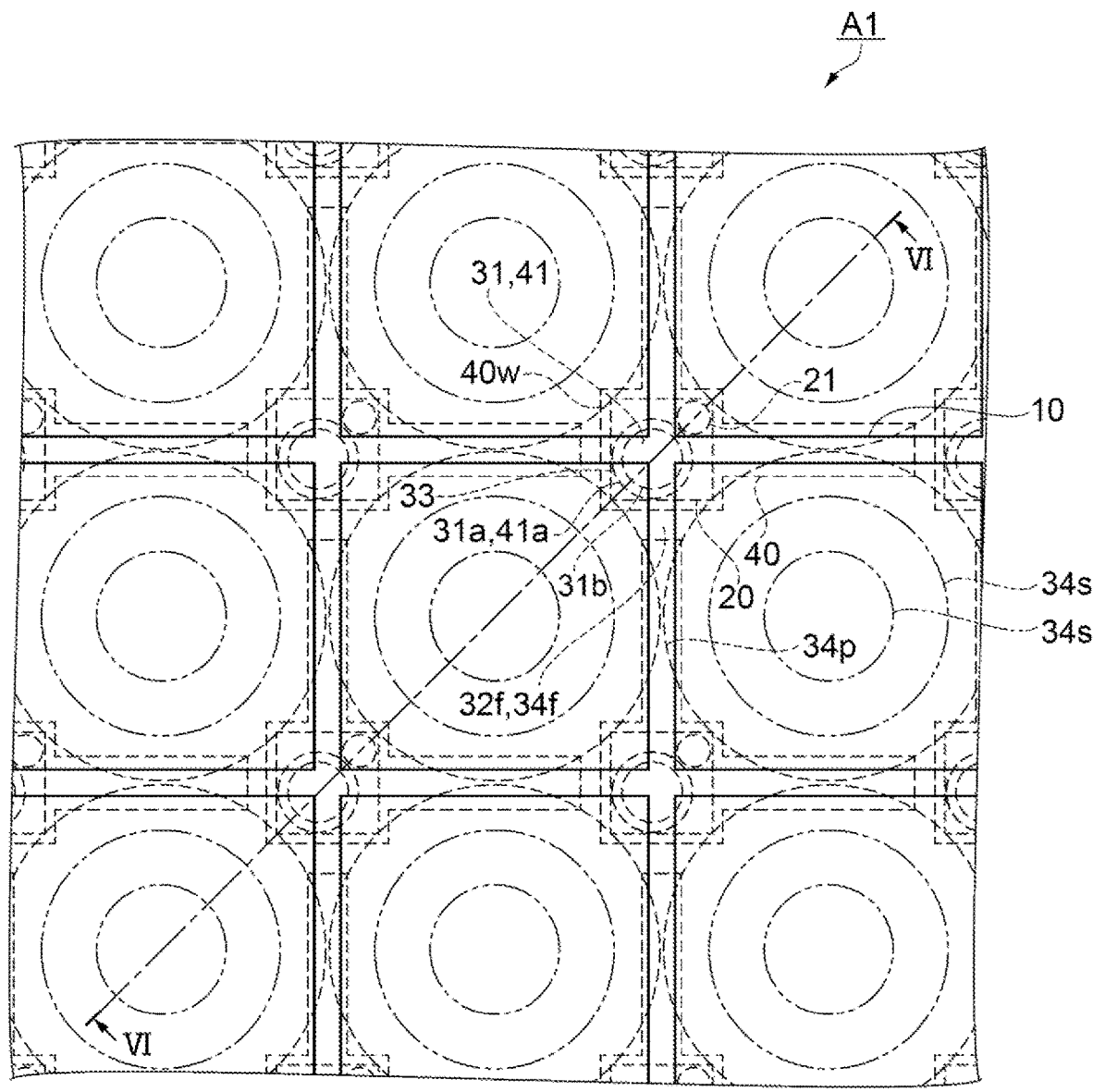
FIG. 16 is a plan view illustrating a part of a display region of an element substrate.
Figure 16:
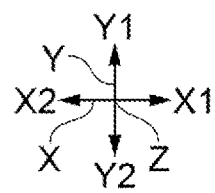

A structure of a liquid crystal device 300 as an electro-optical device according to Embodiment 5 will be described with reference to FIGS. 15 and 16. FIG. 15 is a cross-sectional view of an electro-optical device according to Embodiment 5, and is a view corresponding to FIG. 6 of Embodiment 1. FIG. 16 is a plan view illustrating a part of a display region of an element substrate.

Embodiment 5 is different from the above-described embodiments in that the lens layer 34 is provided on the light transmitting layer 42 and the light transmitting layer 32 is provided on the lens layer 34. The same reference numerals are given to the same configurations as in each of the embodiments, and the description thereof will be omitted.

As shown in FIG. 15, the lens surface 34s of the lens layer 34 has a convex shape. Further, the lens layer 34 has a planar portion 34f between the lens surface 34s and the adjacent lens surface 34s.

The light transmitting layer 32 is provided on the lens layer 34 and has a planar portion 32f along a shape of the planar portion 34f of the lens layer 34.

The contact hole 33 passes through the planar portion 32f of the light transmitting layer 32 and the planar portion 34f of the lens layer 34.

As shown in FIG. 16, in Embodiment 5, a region surrounded by boundary lines 34p of four adjacent lens surfaces 34s is a planar portion 34f. The boundary line 34p indicates a boundary between the lens surface 34s and the planar portion 34f.

The contact plugs 31 and the contact plugs 41 are provided at positions overlapping the planar portion 34f of the lens layer 34 and the planar portion 32f of the light transmitting layer 32 in plan view.

6. Embodiment 6

Figure 17:
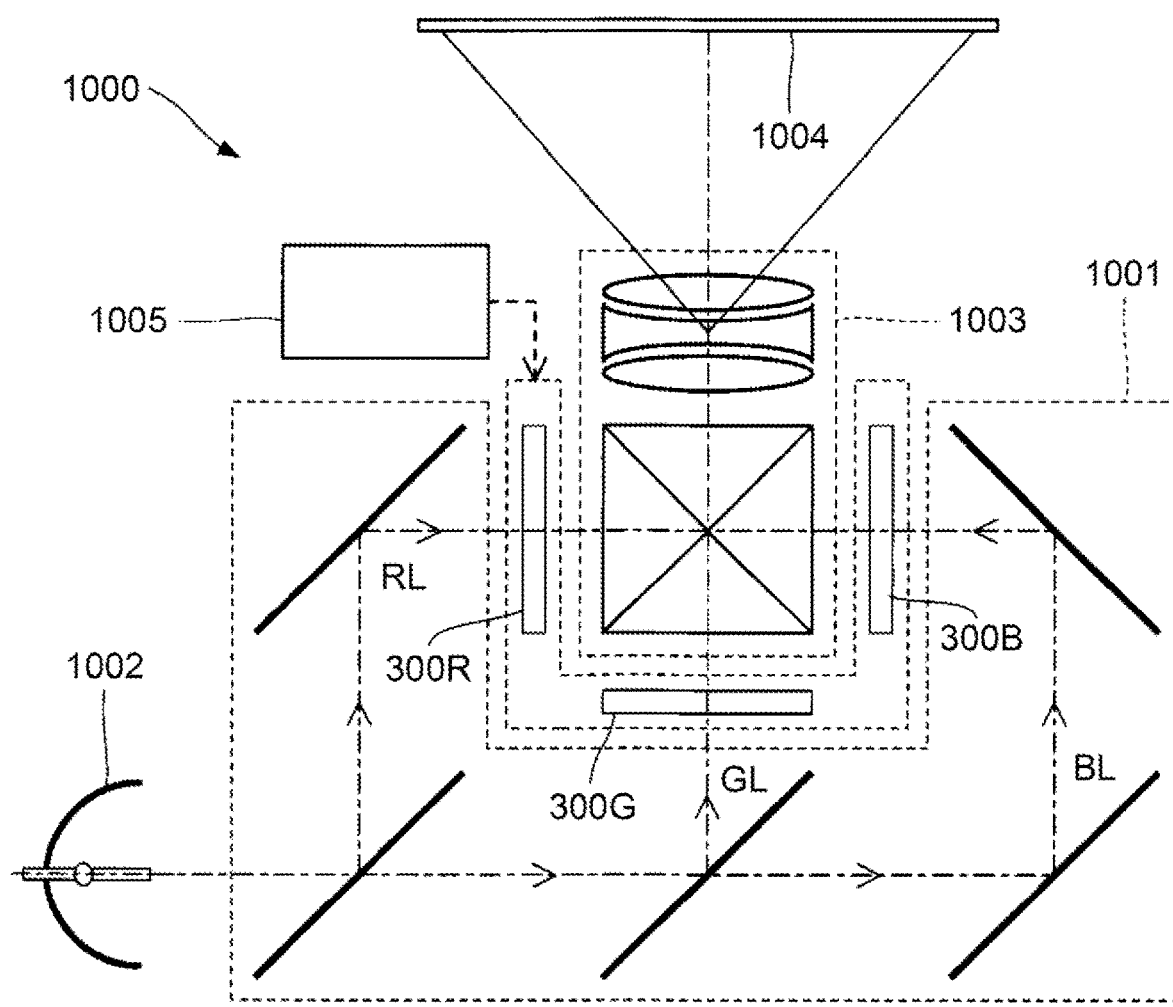
FIG. 17 is a schematic diagram illustrating an example of an electronic apparatus according to Embodiment 6.

FIG. 17 is a schematic diagram showing a projector as a projection display device which is an example of the electronic apparatus.

The projector 1000 is, for example, a three plate type projector including three liquid crystal devices 300 described above. A liquid crystal device 30CR corresponds to a red display color, a liquid crystal device 300G corresponds to a green display color, and a liquid crystal device 300B corresponds to a blue display color. A control unit 1005 includes, for example, a processor and a memory, and controls operations of the liquid crystal devices 300R, 300G, and 300B.

An illumination optical system 1001 supplies a red element RL of light emitted from an illumination device 1002 as a light source to the liquid crystal device 300R, a green element GL of the light to the liquid crystal device 300G, and a blue element BL of the light to the liquid crystal device 300B. Each of the liquid crystal devices 300R, 300G, and 300B functions as a light modulation device that modulates each color light RL, GL, and BL supplied from the illumination optical system 1001 according to a display image.

A projection optical system 1003 combines emission light from each of the liquid crystal devices 300R, 300G, and 300B and projects the combined light onto a projector screen 1004.

As described above, the projector 1000 as the electronic apparatus according to the embodiment includes the liquid crystal device 300 described above.

Therefore, it is possible to improve performance of the projector 1000 by adopting the liquid crystal device 300 having high optical performance and high electrical reliability.

The electronic apparatus is not limited to the illustrated three plate type projector 1000. For example, the projector may be a single plate type projector, a double plate type projector, or a projector including four or more liquid crystal devices 300. Further, the electric apparatus may be personal digital assistants (PDA), digital still cameras, televisions, video cameras, car navigation apparatuses, in-vehicle displays, electronic organizers, electronic paper, calculators, word processors, workstations, videophones, point-of-sale (POS), printers, scanners, copiers, video players, or equipment including a touch panel.

Although preferred embodiments have been described above, the present disclosure is not limited to the above-described embodiments. In addition, the configuration of each component of the present disclosure may be replaced with any configuration that exerts the equivalent functions of the above-described embodiments, and to which any configuration may be added.

What is claimed is:

1. An electro-optical device comprising:
   a transistor;
   a pixel electrode provided corresponding to the transistor;
   a lens layer provided in a layer between the transistor and the pixel electrode, the lens layer having a curved surface;
   a first relay layer provided in a layer between the transistor and the lens layer;
   a second relay layer provided in a layer between the first lens layer and the pixel electrode to be electrically connected to the pixel electrode via a first contact hole; and
   a third relay layer provided in a layer between the first relay layer and the lens layer, the third relay layer being electrically connected to the first relay layer via a second contact hole and being electrically connected to the second relay layer via a third contact hole, wherein
   the first contact hole overlaps the curved surface of the lens layer in plan view, and
   the third contact hole overlaps the second contact hole in plan view.

2. The electro-optical device according to claim 1, further comprising:
   a first connecting member provided in the first contact hole; and
   a second connecting member provided in the second contact hole, wherein
   the first connecting member and the second connecting member are provided in a region overlapping the first relay layer in plan view.

3. The electro-optical device according to claim 2, wherein
   the first connecting member and the second connecting member are provided not to overlap each other in plan view.

4. The electro-optical device according to claim 2, wherein a first light transmitting layer having the second contact hole is provided in a layer between the first relay layer and the second relay layer.

5. The electro-optical device according to claim 4, further comprising
a second light transmitting layer including an insulating layer and a protective layer provided in a layer between the second relay layer and the pixel electrode, wherein
the first contact hole is provided to extend through the insulating layer and the protective layer.

6. The electro-optical device according to claim 5, further comprising
a third light transmitting layer provided in a layer between the first light transmitting layer and the second relay layer, wherein
the lens layer is provided in a layer between the third light transmitting layer and the second relay layer, and
the lens layer and the third light transmitting layer have the third contact hole extending through the lens layer and the third light transmitting layer in a region overlapping the first relay layer in plan view.

7. The electro-optical device according to claim 6, further comprising a third connecting member provided inside the third contact hole.

8. The electro-optical device according to claim 7, wherein
the third connecting member is provided to be in contact with the second connecting member.

9. The electro-optical device according to claim 7, wherein
the third relay layer is provided in a region overlapping the first relay layer in plan view.

10. The electro-optical device according to claim 9, wherein
a part of the third connecting member is provided in the third relay layer.

11. The electro-optical device according to claim 9, wherein
the third light transmitting layer includes a first layer and a second layer,
a fourth relay layer is provided between the first layer and the second layer to be electrically connected to the third relay layer and electrically connected to the second relay layer, and
the fourth relay layer is provided in a region overlapping the first relay layer in plan view.

12. An electronic apparatus comprising the electro-optical device according to claim 1.

13. The electro-optical device according to claim 1, wherein
the entire first contact hole is provided in a layer between the lens layer and the pixel electrode.

14. The electro-optical device according to claim 1, wherein
the third contact hole is provided so as to penetrate through the lens layer.

* * * * *